United States Patent
Lee

(10) Patent No.: US 10,544,735 B2
(45) Date of Patent: Jan. 28, 2020

(54) ROTATING PULSE DETONATION ENGINE, POWER GENERATION SYSTEM INCLUDING THE SAME, AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

( * ) Notice: Subject to any disclaimer, the term of this patent is extended or adjusted under 35 U.S.C. 154(b) by 1009 days.

(21) Appl. No.: 15/046,965

(22) Filed: Feb. 18, 2016

(65) Prior Publication Data

US 2017/0082068 A1     Mar. 23, 2017

Related U.S. Application Data

(60) Provisional application No. 62/172,560, filed on Jun. 8, 2015, provisional application No. 62/285,174, filed on Oct. 21, 2015.

(51) Int. Cl.
*F02C 5/04* (2006.01)
*F02C 5/12* (2006.01)
(Continued)

(52) U.S. Cl.
CPC ............ *F02C 5/04* (2013.01); *F02C 5/12* (2013.01); *F02K 1/78* (2013.01); *F02K 7/06* (2013.01); *F02K 9/64* (2013.01)

(58) Field of Classification Search
CPC ..... F02K 7/06; F02K 1/78; F02K 9/64; F02C 5/12; F02C 5/04; F23R 3/56; F01D 1/32
(Continued)

(56) References Cited

U.S. PATENT DOCUMENTS 2,397,357 A  *  3/1946  Kundig ................ F02C 7/00
                                                     416/21
2,599,209 A     6/1952  Tenney et al.
(Continued)

FOREIGN PATENT DOCUMENTS

WO       2014018416 A1     1/2014

OTHER PUBLICATIONS

International Preliminary Report on Patentability dated Dec. 21, 2017; International Application No. PCT/US2016/035838; 9 pages; The International Bureau of WIPO, Geneva, Switzerland.
(Continued)

*Primary Examiner* — Ted Kim
(74) *Attorney, Agent, or Firm* — Andrew D. Fortney; Central California IP Group, P.C.

(57) ABSTRACT

An engine, a power generation system, and methods of manufacturing and using the same are disclosed. The engine includes a detonation/combustion chamber configured to detonate a fuel and rotate around a central rotary shaft extending from the chamber, a fuel supply inlet configured to provide the fuel to the chamber, an air supply channel configured to supply air to the chamber, at least two rotating arms extending radially from the chamber and configured to exhaust gases from detonating the fuel in the chamber and provide a rotational thrust and/or force, and a mechanical work unit configured to receive at least part of the rotational thrust and/or force. Each of the rotating arms has an exhaust nozzle at a distal end thereof, the exhaust nozzle being at or having an angle configured to provide the rotational thrust and/or force.

13 Claims, 15 Drawing Sheets

(51) Int. Cl.
*F02K 1/78* (2006.01)
*F02K 7/06* (2006.01)
*F02K 9/64* (2006.01)

(58) Field of Classification Search
USPC .............................................. 60/39.34, 39.35
See application file for complete search history.

(56) References Cited

U.S. PATENT DOCUMENTS

| | | | |
|---|---|---|---|
| 3,008,293 A * | 11/1961 | Servanty | B64C 27/18 |
| | | | 416/20 R |
| 3,059,428 A | 10/1962 | Galonska | |
| 3,266,252 A | 8/1966 | Hughes | |
| 3,516,253 A | 6/1970 | Allport et al. | |
| 3,811,275 A * | 5/1974 | Mastrobuono | F02C 5/04 |
| | | | 60/39.15 |
| 4,024,705 A * | 5/1977 | Hedrick | F02C 3/165 |
| | | | 60/39.183 |
| 4,577,460 A * | 3/1986 | Wirsching | F02C 3/165 |
| | | | 415/909 |
| 4,741,154 A | 5/1988 | Eidelman | |
| 5,282,356 A | 2/1994 | Abell | |
| 5,408,824 A * | 4/1995 | Schlote | F01D 1/32 |
| | | | 416/21 |
| 5,636,509 A | 6/1997 | Abell | |
| 2004/0025509 A1 | 2/2004 | Lawlor et al. | |
| 2005/0120719 A1 | 6/2005 | Olsen | |
| 2005/0241315 A1 | 11/2005 | Schlote | |
| 2006/0260291 A1 | 11/2006 | Vandervort et al. | |
| 2008/0178572 A1 | 7/2008 | VanHolstyn | |
| 2011/0073048 A1 | 3/2011 | Juan et al. | |
| 2014/0338358 A1 | 11/2014 | Lee | |

OTHER PUBLICATIONS

International Search Report and Written Opinion; International Searching Authority/US dated Aug. 30, 2016; International Application No. PCT/US16/35838; 9 pages; International Searching Authority/Commissioner for Patents, Alexandra, Virginia.

D.A. Schwer and K. Kailasanath; Rotating Detonation—Wave Engines; 2011 NRL Review; 6 pages.

* cited by examiner

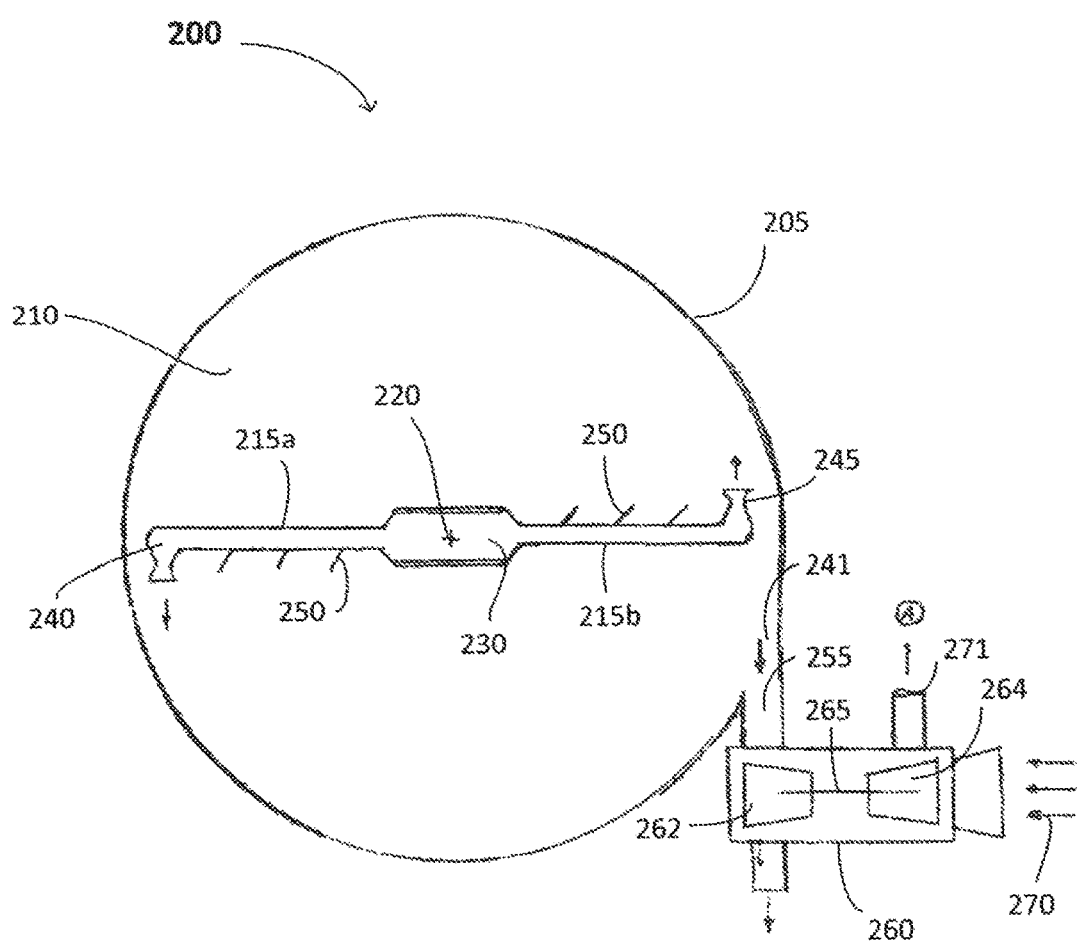

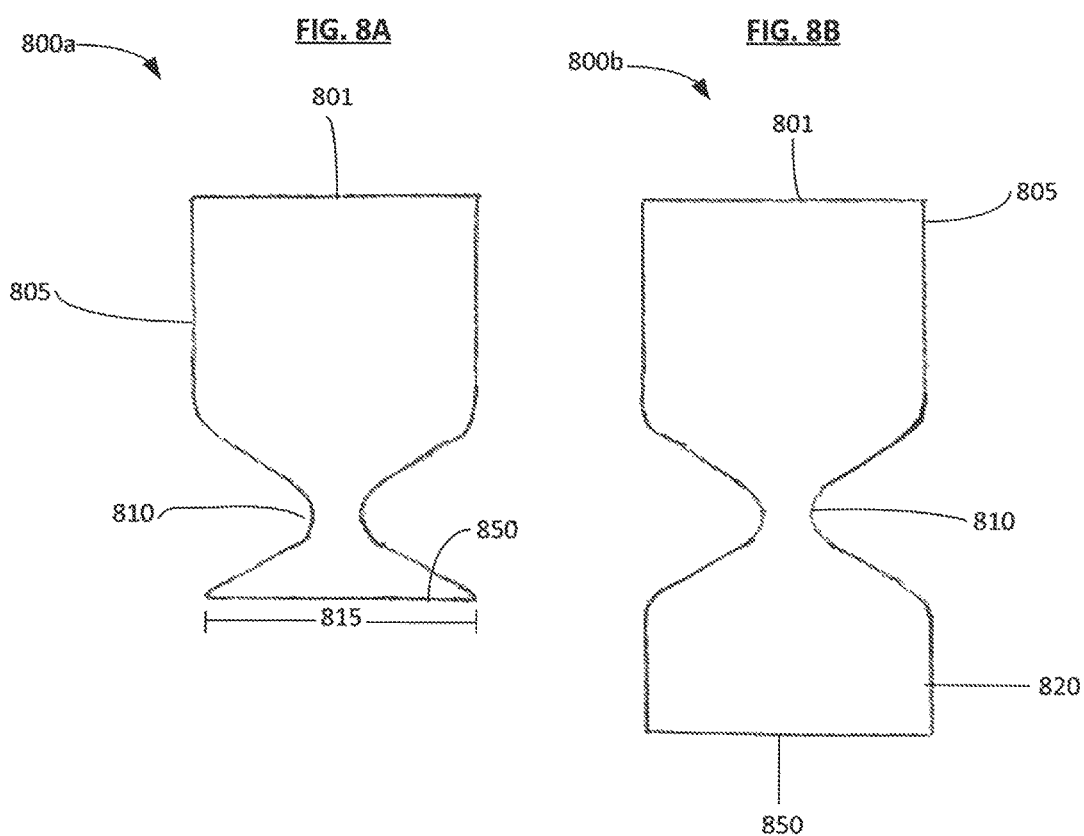

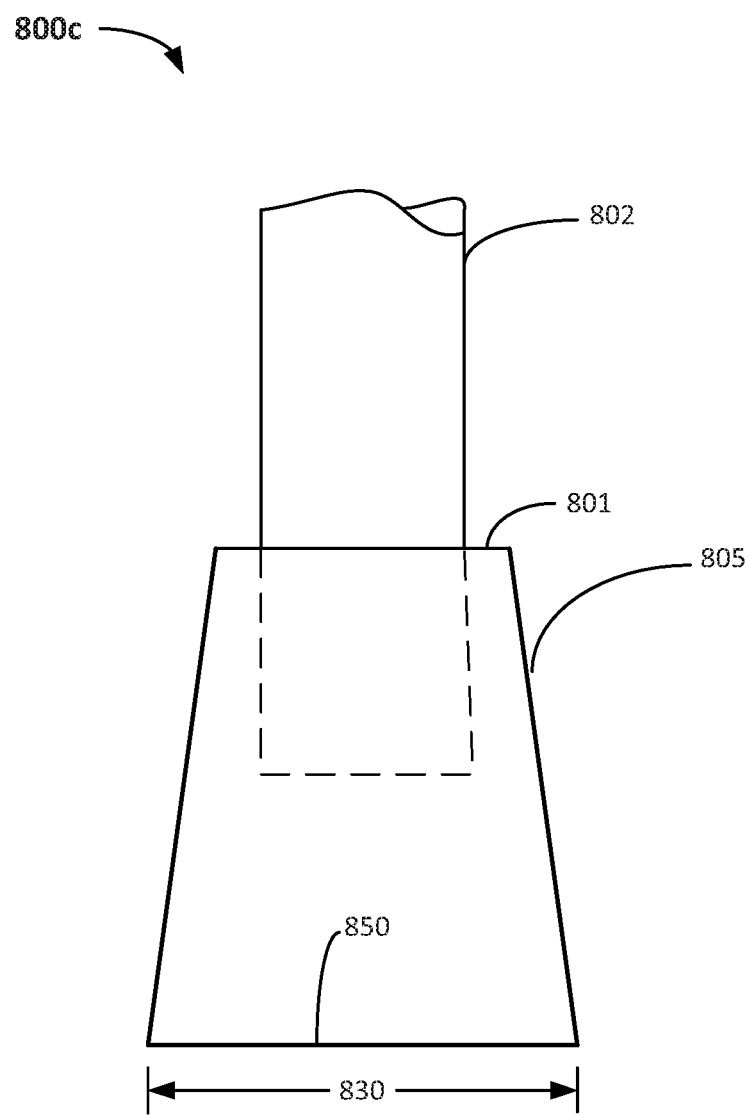

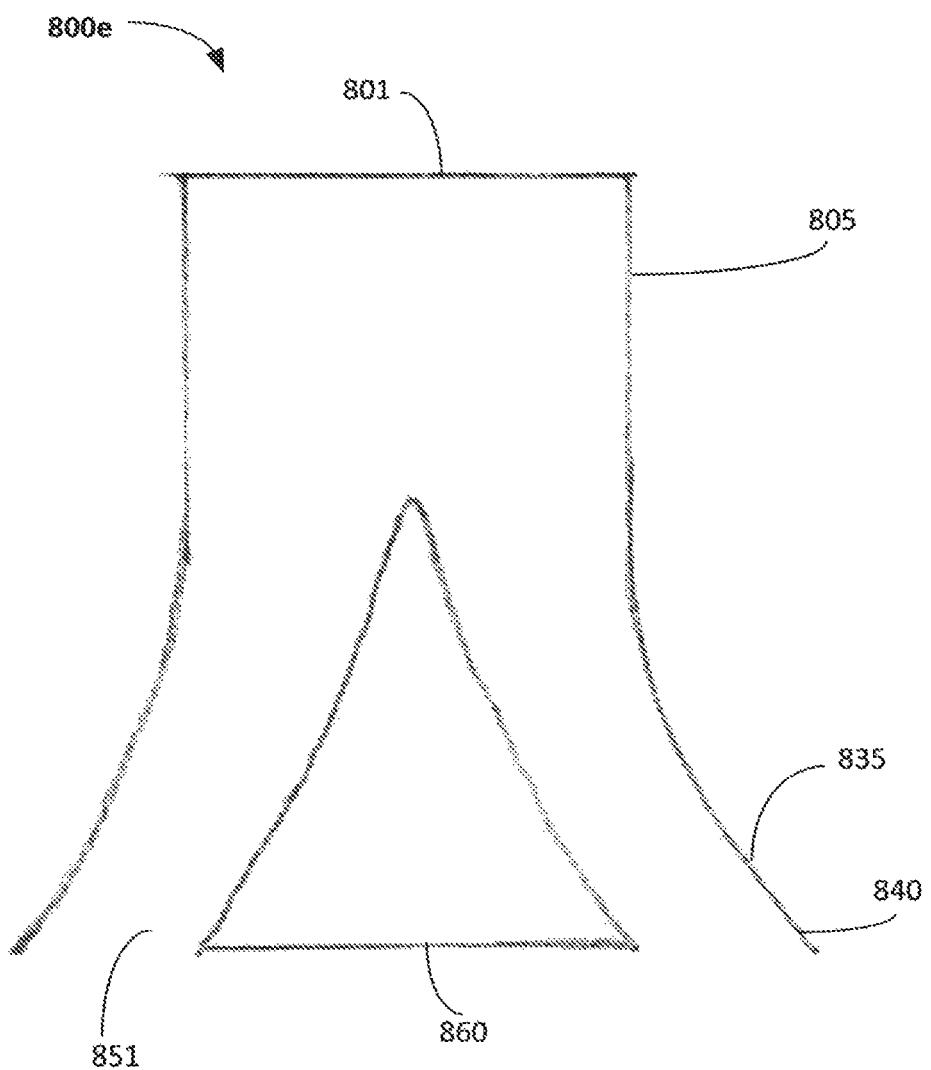

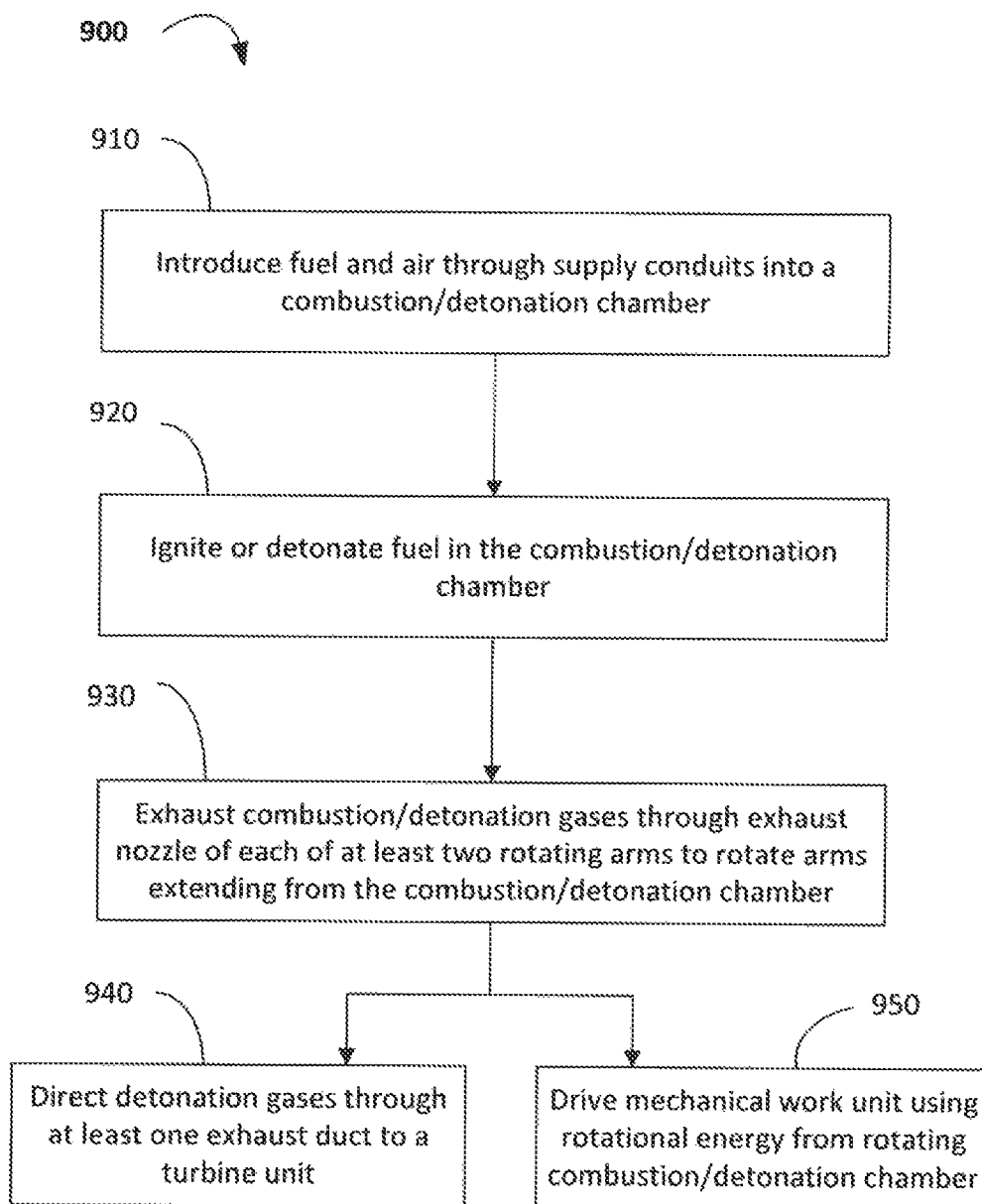

ROTATING PULSE DETONATION ENGINE, POWER GENERATION SYSTEM INCLUDING THE SAME, AND METHODS OF MAKING AND USING THE SAME

CROSS REFERENCE TO RELATED APPLICATION

This application claims the benefit of U.S. Provisional Patent Application Nos. 62/172,560, filed on Jun. 8, 2015, and 62/285,174, filed on Oct. 21, 2015, which are incorporated herein by reference as if fully set forth herein.

FIELD OF THE INVENTION

The present invention generally relates to the field of detonation and/or combustion engines. More specifically, embodiments of the present invention pertain to a novel rotating pulse detonation and/or combustion engine, a power generation system including the same, and methods of manufacturing and using the same.

DISCUSSION OF THE BACKGROUND

Conventional coal and oil combustion is still the main energy source for electricity generation and for powering cars and modern jets. However, these technologies cause air pollution and global warming.

In conventional jet engines, air is compressed and slowed down by means of compressors and then mixed with fuel before entering a combustion chamber. The hot products of the reaction from combustion then drive turbines, which have a common axis with the compressors. The hot products converge through a nozzle and accelerate out of the nozzle, thereby producing forward moving force. The net thrust of a jet engine is a result of pressure and momentum changes within the engine. Some of these changes produce forward forces, yet some produce rearward or backward forces. The major rearward forces are due to the energy used to drive the turbines. Therefore, a fraction of the energy is left for jet engine thrust.

Pulsed jet engines, pulse detonation engines, and other similar types of engines have the simplicity and efficiency of combustion engines, at least in principle. Such engines have drawn attention over the last 70 years. Generally, in conventional pulsed engines and detonation engines, one pipe extends from the combustion chamber, which causes a recoiled shock wave.

Pulsed jet engines are used today in drone aircraft, flying control line mode aircraft, radio-controlled aircraft, fog generators, industrial drying and home heating equipment. The pulse detonation engine (PDE) marks a new approach towards non-continuous jet engines and promises higher fuel efficiency compared to turbofan jet engines, at least at very high speeds. Currently, Pratt & Whitney and General Electric have active pulse detonation engine research programs. Most pulse detonation engine research programs use pulsed jet engines for testing ideas early in the design phase. Boeing has a proprietary pulse jet engine technology called Pulse Ejector Thrust Augmenter (PETA). These engines are relatively difficult to integrate into commercial manned aircraft designs because of noise and vibration, although they excel on smaller-scale unmanned vehicles. Although pulse detonation engines have been considered for propulsion for over 70 years, practical pulse detonation engines have yet not been put into high volume production.

Generally, turbine engines have been used to propel vehicles (e.g., jets) and to generate industrial electrical power and central power. Typically, a turbine engine includes a compressor, a combustor, and a turbine in a sequential arrangement. Influent air is compressed to a high pressure in the compressor and is fed at a high speed and pressure into the combustor, where the air is mixed with a fuel and is combusted to produce a hot, pressurized stream of gas that is passed into the turbine section, where the gas expands and drives a turbine. The turbine converts the energy (e.g., enthalpy) of the gas into mechanical work that drives the compressor and optionally other devices coupled to the gas turbine.

FIG. 1A shows a conventional turbine engine 100 which is typically used in airplanes and power generation. The gas turbine engine 100 of FIG. 1A includes a compressor section 114 (which may have multiple stages) for increasing the pressure and temperature of influent air (e.g., at air intake 112); a combustion section or chamber 116 that may have multiple combustion chambers located around the perimeter of the engine, in which fuel is ignited to further increase the temperature and pressure of the influent air; and a turbine section 118 in which the hot, pressurized air or exhaust 120 is delivered to drive the rotors of the turbine and generate mechanical energy to spin the central axle of the turbine and generate power and/or thrust.

Although recent technology advancements have enabled the use of smaller, lighter gas turbines that are more efficient and less polluting than other engine types (e.g., combustion engines), the efficiency of gas turbines can be improved. For example, conventional natural gas-fired turbine generators convert only between 25 and 35 percent of the natural gas heating value to useable electricity. In addition, conventional engines carry a heavy load of fuel and oxidizers. Furthermore, conventional engines general require specific types of fuel. Therefore, the need exists for more efficient and/or more adaptable turbine technologies for propelling vehicles and producing energy and/or electricity.

FIG. 1B shows a conventional rocket engine 130, including fins 132, a nose cone 135, a payload or payload system 140, and guidance system 145, a fuel tank 150, an oxidizer tank 160, pumps 165 feeding fuel and oxidizer from the fuel tank 150 and oxidizer tank 160, respectively, and a combustion chamber 170 with a nozzle 175. Combustion of the fuel using the oxidizer in the combustion chamber 170 creates thrust for moving the payload (e.g., in the payload system/storage area 140) a long distance. However, fuel and oxidizer must be stored in the rocket housing, and the weight of the fuel and oxidizer necessitates more fuel and oxidizer (e.g., to move the fuel and oxidizer), and decreases the efficiency of the engine.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a novel detonation and/or combustion engine, a power generation system, and methods of manufacturing and using the same. The present invention provides an engine that advantageously uses pulsed detonation to generate a rotational driving force for a motor. As a result, the present engine may be more efficient and may have less wear and tear than conventional combustion engines, as well as fewer parts subject to such wear and tear. Furthermore, the present engine can advantageously utilize the exhaust detonation gases to drive a turbine unit that may be connected to an exhaust duct extending from the engine, which may increase the net thrust.

In one aspect, the present invention relates to an engine that includes a detonation and/or combustion chamber configured to detonate a fuel and rotate around a central rotary shaft extending from the detonation and/or combustion chamber, a fuel supply inlet configured to provide the fuel to the detonation and/or combustion chamber, an air supply channel configured to supply air to the detonation and/or combustion chamber, at least two rotating arms extending radially from the detonation and/or combustion chamber, and a mechanical work unit configured to receive at least part of the rotational thrust and/or force. The rotating arms are configured to exhaust gases from detonating the fuel in the detonation and/or combustion chamber and provide a rotational thrust and/or force. Each of the rotating arms has an exhaust nozzle at a distal end thereof. The exhaust nozzle has or is at an angle configured to provide the rotational thrust and/or force.

In exemplary embodiments of the present invention, the engine further includes a housing substantially enclosing the detonation and/or combustion chamber and the rotating arms. The housing includes at least one exhaust duct extending therefrom. The detonation and/or combustion chamber may include an inner wall and an outer wall. The inner wall may include a plurality of openings (which may be indirect openings) to provide an air flow (e.g., cross flow, reverse flow and/or cyclone flow) inside the detonation and/or combustion chamber from the detonation gases.

In various embodiments of the present invention, the engine includes a valve (e.g., one or more one-way valves) between (a) at least one of the air supply and the fuel inlet and (b) the detonation and/or combustion chamber. In some embodiments of the present invention, the engine may include an ignition device that ignites or detonates the fuel in the detonation and/or combustion chamber.

In exemplary embodiments of the present invention, each of the rotating arms includes a cylinder or a curved tubular arm. In addition, each of the rotating arms may further include metal sheets or foils attached or connected to upper and lower surfaces of each of the rotating arms. The shape of the metal sheets or foils may optimize an aerodynamic function and/or minimize air resistance (e.g., forming one or more fins or structures that form a propeller). Furthermore, each of the rotating arms may be thermally insulated to prevent and/or minimize energy loss. In various embodiments, the rotating arms are equally spaced from each other by 360°/n, where n equals the number of the rotating arms. For example, the engine may include at least four rotating arms. In further embodiments, the nozzle has an opening oriented about 90° relative to an imaginary straight line between the rotation axis and the nozzle opening or the angle of the corresponding rotating arm from the detonation and/or combustion chamber. The engine may also include a number of the detonation and/or combustion chambers equal to the number of rotating arms.

In some embodiments of the present invention, the engine may include a generator, a motor, a pump, or a turbine that receives rotational force or mechanical energy from the central rotary shaft. In exemplary embodiments of the present invention, the engine further includes a turbine unit including one or more turbine fans rotated by the detonation gases. In the latter case, the engine may further include a compressor that shares a common shaft with the turbine unit. The compressor compresses the air supplied by the air supply to the detonation and/or combustion chamber.

Another aspect of the present invention relates to a method of converting fuel into energy, including introducing air into a detonation and/or combustion chamber through an air supply channel, introducing a fuel into the detonation and/or combustion chamber through a fuel supply inlet, detonating the fuel in the detonation and/or combustion chamber, exhausting detonation gas(es) through a plurality of rotating arms extending radially from the detonation and/or combustion chamber and an exhaust nozzle at a distal end of each rotating arm, thereby rotating the rotating arms, and generating a rotational thrust and/or force, and converting the rotational thrust and/or force into mechanical work or energy.

In various embodiments of the present invention, the detonation gas(es) may be directed through at least one exhaust duct in a housing that encloses or substantially encloses the detonation and/or combustion chamber, the rotating arms and the nozzles. In exemplary embodiments, the exhaust duct(s) direct the detonation gases to a turbine unit. The turbine unit generates additional mechanical work or energy. In further embodiments of the present invention, the method includes compressing the air that is introduced into the detonation and/or combustion chamber with a compressor receiving the additional mechanical work or energy from the turbine.

In some embodiments, the detonation and/or combustion chamber has an outer wall and an inner wall with a plurality of openings therein. The openings in the inner wall generate cross flow, reverse flow and/or cyclone flow in the detonation and/or combustion chamber from the detonation gases. In other embodiments, each of the exhaust nozzles exhaust the detonation gas(es) at an angle of approximately 90° relative to an imaginary straight line between the rotation axis to the nozzle opening or the angle at which the corresponding rotating arm extends from the detonation and/or combustion chamber.

In various embodiments of the present invention, a pulse frequency for detonating the fuel in the detonation and/or combustion chamber may be regulated using a valve between (i) the detonation and/or combustion chamber and (ii) at least one of the air supply channel and the fuel supply inlet. In some embodiments of the present invention, the valve may include a one-way valve or a check valve that restricts the flow of fluid to a single direction by opening and closing under relative pressures on each side of the valve.

Furthermore, the present turbine engine can be adapted for power generation or other mechanical drive applications (e.g., milling or ground vehicles). For instance, the present invention advantageously provides a hybrid turbine engine that can be used in conventional electrical power generation. The spinning shaft of the turbine can be used to drive an electricity generator. Thus, the novel turbine can be integrated into conventional electricity power generation systems without special design changes or excessive cost. Additionally, the novel hybrid turbine can be manufactured using materials and parts similar to those used in conventional turbines, and thus the cost of manufacturing may be substantially the same as that of conventional turbines. Also, the present invention leads to essentially near perpetual energy without significant pollution or environment impact. The present invention has the potential to drastically change our economy and even our day-to-day lives by minimizing pollution and the effects of global warming.

The present engine (which, in exemplary embodiments, may be termed a "rotating pulse detonation engine" [RPDE], an acoustic-type pulse engine) advantageously is relatively simple. Furthermore, since there are few or no moving parts to wear out, the present invention is relatively easy to maintain and simple to construct. The present engine has an excellent balance of cost and function, and is based on a simple design that performs relatively well and at relatively low or minimal cost. The present engine is not sensitive to debris and runs on a variety of different types of fuels. The present rotating pulse detonation engine (RPDE) can be easily scaled up or down, and can be arranged in one or more stages and/or in an array.

The present rotating pulse detonation engine technology enables low-cost electricity generation (LEG), supersonic transportation (SST), and vertical take-off and landing (VTOL) capabilities. Thus, the present invention is beneficial to various industries, such as power generation, transportation, aeronautics and national defense. For example, LEG facilities including electric power plants and mobile power stations can provide power for industrial and agriculture equipment. The present invention may advantageously increasing efficiency of generating power through windmills. In addition, the present invention advantageously enables SST and VTOL flying vehicles with supersonic speed and vertical takeoff and landing capability. Furthermore, the present invention enables a variety of conventional commercial electricity generation applications, such as supplying electricity to motors that drive vehicles, ships, and various locomotives, and powering milling operations. The present invention advantageously benefits SST and VTOL applications and expands such capabilities for national defense purposes.

The present RPDE is advantageous over conventional Pulse Detonation Engine (PDE) technology. For example, conventional PDE technology is typically a type of propulsion system that uses a detonation wave resulting from pulsed combustion (e.g., combustion of a fuel and air mixture that is subsequently pulsed). In a detonation engine, fuel and air are imported to the chamber and mixed to create a flammable mixture when ignited. The resulting combustion generates a shock wave in all directions that raises pressures in a tuned resonant cavity to levels as much as ten times more than those of conventional engines. The combustion gases at such pressures expand through various outlets and/or inlets at a high velocity for thrust. Such pulsed shock waves repeat with self-ignition at a frequency, for example, on the order of a few thousand cycles per minute. Similar to a brass musical instrument built with certain criteria resulting in a particular harmonic resonance characteristic, the relationship between the size of the chamber and size of the outlet, the configuration and position of the outlet, and the size of the inlet of the pulse detonation engine should be optimized (e.g., "in tune") to provide successful operation of the PDE.

Relative to a conventional rocket engine, the present engine and method(s) is advantageously simpler and easier to manufacture and repair, as the payload can be absent, the fuel and oxidizer tanks can be located outside of the same housing that includes the combustion chamber (which may also improve the safety of the present invention), and the efficiency can be greatly improved. For example, with less weight in the housing containing the combustion/detonation chamber, frictional forces can be reduced, and the atmosphere inside the engine can be made less dense, further reducing rotational resistance in the present engine. As a result, the present engine and method(s) can contribute a relatively high proportion of the thrust towards rotational torque. These and other advantages of the present invention will become readily apparent from the detailed description of various embodiments below.

BRIEF DESCRIPTION OF THE DRAWINGS

FIG. 2B is a top-down view of the exemplary engine of FIG. 2A.

FIGS. 3A-C are cross-sectional views of various exemplary rotating pulse detonation engines, in which FIG. 3A is a cross-sectional view of another exemplary rotating pulse detonation engine showing a fuel inlet and an ignition device according to one or more embodiments of the present invention, FIG. 3B is a cross-sectional view of a further exemplary rotating pulse detonation engine showing a one-way valve according to another embodiment of the present invention, and FIG. 3C is a cross-sectional view of a yet another exemplary rotating pulse detonation engine having a double wall chamber according to one or more embodiments of the present invention.

FIGS. 8A-E are cross-sectional diagrams of exemplary nozzles according to embodiments of the present invention.

FIG. 9 is a flow chart showing steps of an exemplary method of converting fuel into energy using a rotating pulse detonation engine according to one or more embodiments of the present invention.

DETAILED DESCRIPTION

Figure 1A:
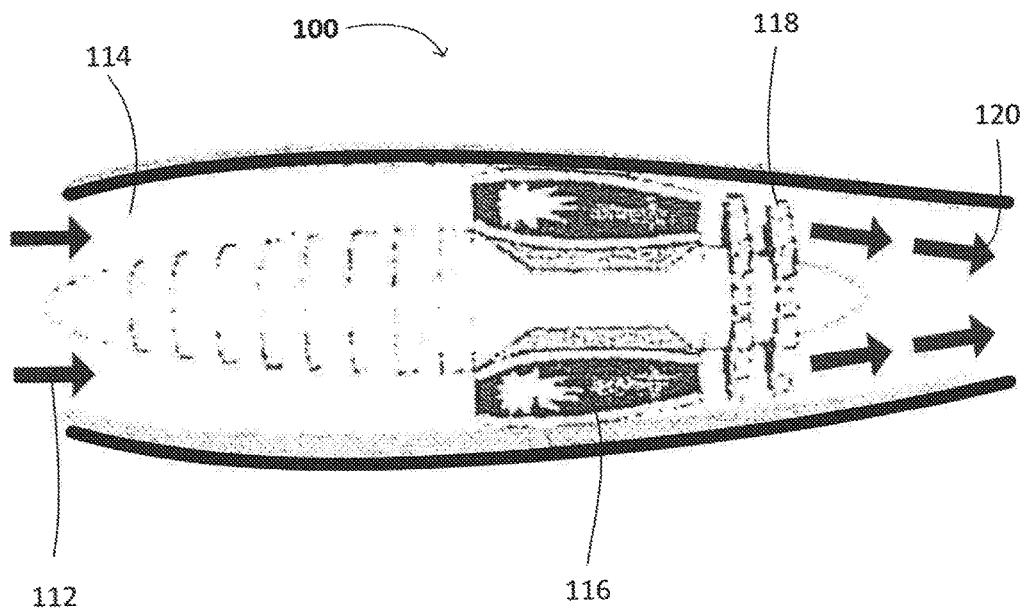
FIG. 1A is a cross-sectional view of a conventional turbine engine.
Figure 1B:
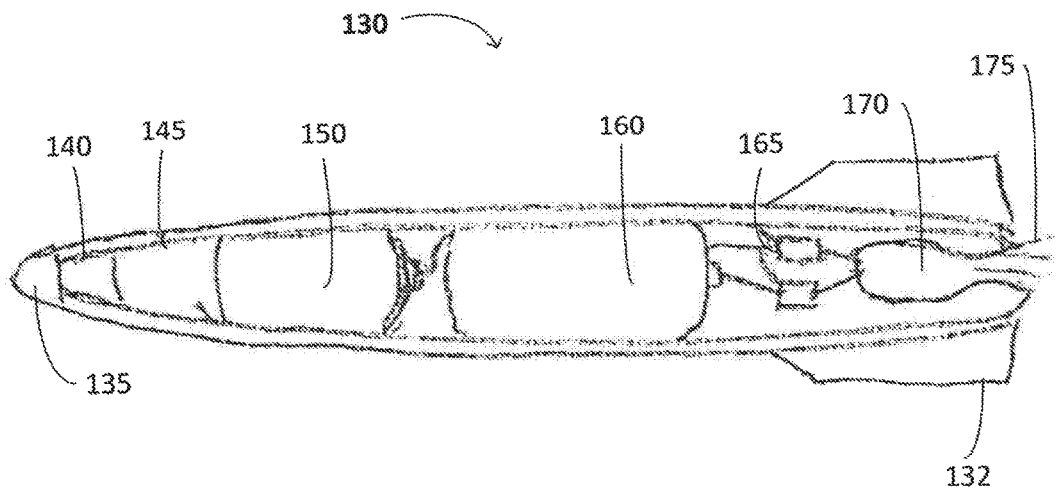
FIG. 1B is a cross-sectional view of a conventional rocket engine.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiments of the present invention relate to a rotating pulse detonation engine, a power generation system, and methods of making and using the same. The present engine is advantageously simpler and easier to manufacture and repair then conventional engines, as it can have as few as two moving parts (the central rotating shaft and the combined detonation and/or combustion chamber and rotating arms), and once the fuel is ignited, subsequent pulsed detonations can auto-ignite, simplifying the ignition mechanism and/or system. Furthermore, with relatively less weight in the housing containing the detonation and/or combustion chamber, frictional forces on or from the moving part(s) can be reduced, and the atmosphere inside the engine can be made less dense, further reducing rotational resistance in the present engine. As a result, the present engine and method(s) can contribute a relatively high proportion of the rotational thrust to rotational torque. In addition, the present engine has advantages over conventional rocket engines, as the payload can be absent, and the fuel and oxidizer supplies can be located outside of the same housing that includes the combustion chamber (which may also improve the safety of the present invention). The present engine can be scaled up or down easily, and can use a wide variety of fuels. With further optimization, the efficiency of the present engine and method(s) can continue to be improved, making the potential for applications and use of the present engine nearly limitless.

An Exemplary Engine

Figure 2A:
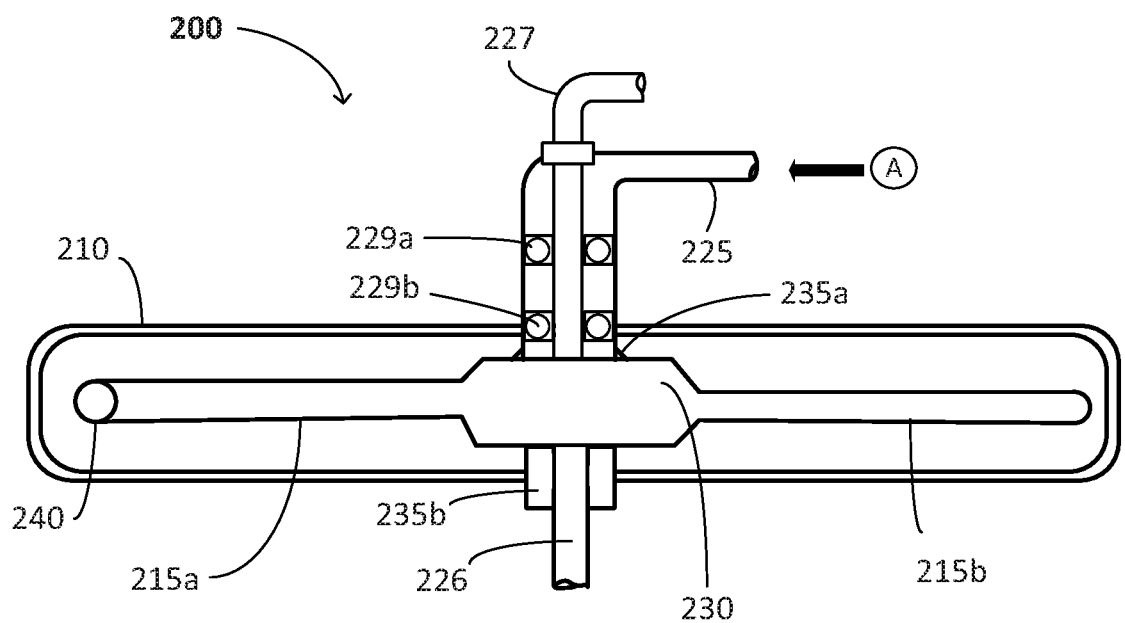
FIG. 2A is a cross-sectional view of an exemplary rotating pulse detonation engine according to one or more embodiments of the present invention.

FIGS. 2A-2B show an exemplary engine 200 according to embodiments of the present invention. The engine 200 generally comprises a housing 210, a central rotary shaft 226, a detonation and/or combustion chamber 230 having first and second rotational arms 215a and 215b, at least one fuel supply inlet 227, at least one air supply channel 225, at least two (2) exhaust nozzles 240 and 245, an optional exhaust duct 255, and an optional mechanical work unit 260. The exhaust nozzles 240 and 245 direct exhaust (i.e., detonation gases) in a particular direction to move the rotating arms 215a-b forward similar to a rocket engine, but movement of the rotating arms 215a-b is constrained (e.g., a fixed orbit around the central rotary shaft 226). The detonation gases exiting the exhaust nozzles 240 and 245 turn the arms 215a-b and the chamber 230 on the central rotary shaft 226 to create a rotational force that can be delivered directly or indirectly by the shaft 226 to drive or power a motor, for aircraft or other vehicles, for generating electricity, or for any other purpose for which engines that create or generate rotational force can be used.

FIG. 2A is a cross-sectional view of the engine 200 in FIG. 2B. The housing 210, which may have a disc shape or other shape (e.g., oval or square, hexagonal, octahedral, rectangular, or other regular or irregular polygon) when viewed from the top or bottom, may comprise a wall with at least one opening 241 therein (see FIG. 2B) to an exhaust duct or port 255. The dimensions (e.g., circumference) of the housing may vary depending on the dimensions of the exhaust nozzles 240 and 245, the chamber 230, and the rotating arms 215a-b. Generally, the housing 210 has a shape configured to allow rotation of the arms 215a-b and the exhaust nozzles 240, 245.

In some embodiments, the housing 210 may have an insulation layer on the inner and/or outer surface of the housing 210 (or between walls of a multi-walled housing). Typically, the insulation layer is a thermo-insulative material. Other various insulative materials may also be used for the insulation layer, such as polyurethane foam, expanded polystyrene, expanded perlite, fiberglass, and/or cork. The housing 210 may be further equipped with an air nozzle (not shown) for introducing additional air around and/or into the chamber 230, for cooling the chamber 230, driving detonation gases and/or particles through an exhaust duct (e.g., 255 of FIG. 2B), etc.

The central rotary shaft 226 (FIG. 2A) is positioned along a central axis 220 (FIG. 2B) of the detonation and/or combustion chamber 230. In some embodiments, the central rotary shaft 226 extends through the lower or rear-facing surface of the housing 210, and in other embodiments, the central rotary shaft 226 extends through both the upper/front-facing and lower/rear-facing surfaces of the housing 210. The central rotary shaft 226 may be connected or joined to a coaxial rod or cable (not shown) at one end, and one or more gears, wheels or fans may be connected to and/or driven by the rod or cable at another end (i.e., an opposite end of the rod or cable).

In exemplary embodiments, the air supply channel 225 receives compressed air and directs the compressed air to the detonation and/or combustion chamber 230. In various embodiments, the air supply channel 225 may include seals 229a-b configured to maintain an airtight supply of air, fuel or both through the housing 210 to the detonation and/or combustion chamber 230, and bearings 235a-b that allow certain parts to rotate (e.g., the central shaft 226 and chamber 230), while other parts stay fixed. Preferably, there are at least two sets of bearings 235a-b having a ring-shaped or toroidal cross-section located around the detonation and/or combustion chamber 230 and the central shaft 226, respectively, as shown in FIG. 2A.

A generator, a motor, a pump, a turbine or other mechanical device may be configured to receive the rotational force from the central rotary shaft 226. Alternatively, the mechanical device may receive another form of mechanical energy converted from the rotational force, such as a cam follower in a cam that is driven by a gear that receives the rotational force. When the mechanical device is a generator, the other forms of mechanical energy received by the generator are generally indirect. For example, the central rotary shaft 226 may drive a belt that, in turn, drives a wheel in the generator. Alternatively, the central rotary shaft 226 may drive a wheel or other mechanism that, in turn, drives a piston, cam, or other mechanism that can generate work, power, or electricity.

The fuel inlet 227 and air supply and/or distribution channel 225 advantageously supply fuel and air (A) to the detonation and/or combustion chamber 230. In some embodiments, the fuel inlet 227 and air channel 225 may include a single conduit or path that supplies a mixture of the fuel and air (A) to the detonation and/or combustion chamber 230. In some embodiments of the present invention, the engine 200 may include an ignition device (not shown in FIGS. 2A-B) that ignites or detonates the fuel in the detonation and/or combustion chamber 330, and an ignition cable or wire to the ignition device. The ignition device may comprise an electrical igniter (e.g., a spark generator or spark plug) or other form of ignition device known in the art, including, but not limited to, a high-temperature wire (e.g., a tungsten or stainless steel filament). The ignition device may be configured for initial ignition of the fuel. After one or more detonations (e.g., detonation pulses or cycles), the fuel may auto-ignite in the chamber 230 (e.g., due to residual heat in the chamber and introduction of sufficient compressed air for the fuel to combust or detonate).

The engine 200 has at least one combustion chamber 230. Alternatively, the engine 200 may have a plurality of combustion chambers 230 (see combustion system 521a-b of FIG. 5(B)). The chamber 230 is configured to receive the fuel and air from the fuel supply conduit 227 and the air channel 225. Typically, the fuel supply conduit 227 is adjacent (e.g., joined) to or coaxial with the air supply conduit 225, and may include a pin or valve (not shown) to introduce the fuel into the detonation and/or combustion chamber 230. The air supply conduit 225 may include a similar or identical pin or valve (not shown) to introduce the compressed air into the detonation and/or combustion chamber 230 at the proper time in the detonation cycle (or pulse). The combustion chamber 230 may include inner and outer walls (not shown). Typically, in such a configuration, the outer wall of the detonation and/or combustion chamber 230 is solid, and the inner wall of the detonation and/or combustion chamber 230 has a plurality of openings configured to result in a particular air flow in the detonation and/or combustion chamber 230, to reduce noise and/or emission of particulate detonation products, etc. In some embodiments, the outer wall may of the detonation and/or combustion chamber 230 has no openings other than at the rotating arms 215a-b.

As shown in FIG. 2A, the exemplary engine 200 has rotating arms 215a and 215b that extend from the detonation and/or combustion chamber 230 and that spin or rotate around the axis 220. The rotating arms 215a-b may be welded and/or connected by bolts, clamps, screws, etc. to the detonation and/or combustion chamber 230, or formed integrally with the chamber 230. In the engine 200, the rotating arms 215a-b may be relatively long (i.e., longer than the combustion chamber 230, by 2×, 3× or more) to retain sufficient hot gas within the combustion chamber 230 to ignite the fuel entering the detonation and/or combustion chamber 230 for the next detonation/combustion pulse. Dimensions of the detonation and/or combustion chamber 230 and the rotating arms 215a-b can be optimized for a certain pulse frequency, rotation rate, etc., and it is within the ability of one skilled in the art to determine such dimensions. For example, the detonation and/or combustion chamber 230 may have a diameter or a height and/or width greater than each of the rotating arms 215a-b (e.g., by 1.5×, 2× or more) for the same purpose and/or to "tune" the detonation pulses to a particular, predetermined or desired frequency. The centrifugal effect of the spinning or rotating arms 215a-b advantageously provides additional speed to the hot gas rushing out of the nozzles 240 and 245, thereby increasing the torque and/or the rotary force generated by the central rotating shaft 226.

In various embodiments, the nozzles 240 and 245 can have any of a variety of shapes, including, but not limited to, circular, oval, curved, constricted, flared, combinations thereof, etc. (see, e.g., FIGS. 9A-D and the discussion thereof herein). The nozzles 240 and 245 may also represent or be in the form of an augmenter, which may have an annular, concentric, or ring-like shape. Generally, the number of nozzles is equal to the number of rotating arms 215a-b.

FIG. 2B is a top-down view of the engine 200 in FIG. 2A. The exemplary engine 200 includes at least one exhaust duct, vent or port 255 that extends from the housing 210. The exhaust duct 255 may be configured to direct exhaust 241 from the housing 210 to a mechanical work unit (e.g., a turbine unit) 260. In some embodiments, a reflector (not shown) may be at the end of the exhaust duct 255 to direct the thrust from the housing 210 to the turbine unit 260. Thus, the detonation exhaust gases may be channeled or directed to a location or stage of the engine where the exhaust gases can perform work (e.g., in the turbine unit 260, that may include one or more turbines 262 and at least one compressor 264).

In some embodiments, each of the rotating arms 215a and 215b may be thermally insulated to prevent energy loss, and may have one or more fins 250 thereon. The fins 250 may be on opposite and/or trailing surfaces of the rotating arms 215a-b. The fins 250 may be at an angle with respect to a vertical or horizontal plane (e.g., defined by the rotating arms 215a-b), or may be curved (e.g., along a circular arc defined at least in part by the rotational path of the arms 215a-b).

Preferably, the engine 200 has an even number of rotating arms 215a-b (e.g., 2, 4, 6, 8, etc.) and the same number of exhaust nozzles. However, the number of rotating arms 215a-b and the number of exhaust nozzles 240, 245 may be 3, 5, 9, or any other number by which 360 can be evenly divided to give an integer or a regular fraction. Evenly-spaced, identical rotating arms (e.g., 215a, 215b) may increase the efficiency and balance of the engine 200.

In exemplary embodiments, each rotating arm 215a-b includes an exhaust nozzle 240 or 245. Each of the exhaust nozzles 240 and 245 may be permanently or detachably connected to a corresponding rotating arm 215a or 215b. The ratio of exhaust nozzles to rotating arms is generally 1:1, but is not limited thereto. For example, multiple exhaust nozzles (e.g., 2 or more) can be positioned at and/or affixed to the end of each rotating arm. Exhaust nozzles may be attached to the rotating arm by various methods, including, but not limited to, welding, shrink fitting, gluing, screwing/threading, and/or compression fitting.

Each exhaust nozzle 240 or 245 is configured to exhaust detonation gases from detonating the fuel in the detonation and/or combustion chamber 230 and provide a rotation thrust and/or force to rotate the rotating arms 215a-b and the central rotary shaft 226 around the central axis 220. The exhaust nozzles 240 and 245 have an angle of about 60° to 120° relative to a line at which the corresponding rotating arm 215a-b extends from the detonation and/or combustion chamber 230 to provide the rotational thrust and/or force. The nozzle may be coplanar with the corresponding rotating arm and the detonation and/or combustion chamber 230. In some examples, the exhaust nozzles 240 and 245 are at an angle of 90° or about 90° relative to an imaginary straight line between the rotation axis to the nozzle opening or the line at which the corresponding rotating arm 215a-b extends from the detonation and/or combustion chamber 230.

After detonation/combustion of the fuel, the exhaust gases first go through one of the rotating arms 240 or 245, and then turn at approximately a 90° angle before existing the nozzle 240, 245. Applying Newton's Third Law of Motion, the engine 200 will generate radial acceleration motion which provides power to drive other devices. A rotation unit (e.g., the rotary shaft 226, the combustion chamber 230, and the arms 215a-b) may be enclosed in a drum-like compartment (e.g., housing 210) with one or more outlets or openings 255. The exhaust gases in the housing 210 can be pushed out of the housing by the fins 250 attached to the rotating arms 215a, 215b. The housing 210 may also function to suppress the noise of detonation/combustion (e.g., serve as noise quencher).

As shown in FIG. 2B, the mechanical work unit may include a turbine unit 260 located at a separate location or compartment external to the housing (e.g., a body of a jet), but that can still generate compressed air (A) to be supplied to the engine 200. The turbine unit 260 includes a turbine 262 and a compressor 264 connected to the turbine 262 via a rod or shaft 265. In some embodiments, the turbine 262 includes one or more rotary fans rotatably fixed to the rod or shaft 265, which in turn provides a spinning force that drives one or more fans, pumps or pistons in the compressor 264. The compressor 264 draws external air 270 from outside the engine, compresses the air at a relatively high pressure, and forces the compressed air through a conduit 271. Having the turbine unit 260 outside of the housing 210 eliminates the burden of the turbine/compressor pair 262, 264 being in the same housing as the engine 200 (which may be advantageous, e.g., in jet engines, where the high temperatures and lack of space can adversely affect mechanical parts therein), and provides the benefit of a compressed air supply (A) that is supplied to the combustion chamber from the turbine unit 260 via the conduit or duct 271. The net thrust in the present system may thus be increased.

Figure 3A:
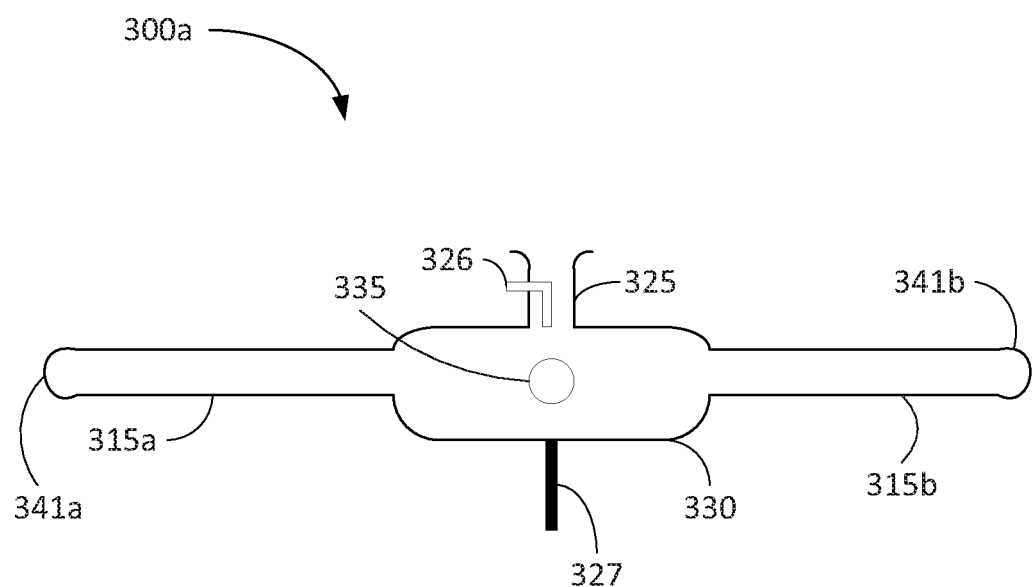

FIG. 3 is a cross-sectional view of another exemplary rotating pulse detonation engine (RPDE) 300 showing a fuel inlet 326 and an ignition device 335 according to the present invention. The exemplary engine includes a detonation and/or combustion chamber 330 having at least two rotating (e.g., tubular) arms 315a, 315b. For rotary engine applications, a central rotation shaft 327 may be on one or more surfaces of the detonation and/or combustion chamber 330 normal to the plane of rotation, and extending from the center of the outer surface of the combustion chamber 330. Air and/or fuel inlet channels 325 and 326 extend from a surface of the detonation and/or combustion chamber 330 (e.g., opposite that of the central shaft 327). The fuel inlet 326 advantageously supplies fuel to the detonation and/or combustion chamber 330.

To start the present engine, the air and fuel are first mixed in the combustion chamber 330. Extra forced air may be induced from the inlet 325 for the first few seconds until the engine starts. The air and fuel mixture is ignited by the ignition device 335, at which point the fuel combusts or detonates, after which a low pressure void forms in the chamber 330, drawing in more air and fuel. The ignition device 335 ignites the fuel again, the low pressure void forms again, and the ignition or vacuum cycle repeats itself for the first few seconds or so until the engine starts (e.g., begins auto-detonation). At this point, the ignition device 335 is turned off and/or disconnected. High pressure detonation shock waves are generated as a result of the ignition and vacuum cycles. The shock waves rush out through the inlet 325 and the outlets 315a and 315b. Generally, the shock waves exit out the inlet 325 first, since the inlet 325 is substantially closer and/or shorter than the arms 315a-b. The momentum of the shock waves leave a low pressure void in the chamber 330, which causes air and fuel flow in and through the inlet 325. In auto-detonation, the fuel and air are ignited by the residual heat of the chamber wall 330 and/or the hot gas that is pulled back from the outlets 315a and 315b. The cycle repeats itself automatically without ignition, and optimally, without adding forced air. For smaller pulse jets, the frequency can be about 250 cycles/s, and for larger pulse jets, the frequency can be about 50 cycles/s.

The present engine 300 is a relatively simple RPDE. The present engine 300 is valveless, relatively low in cost, light weight, relatively powerful and relatively easy to operate.

Figure 3B:
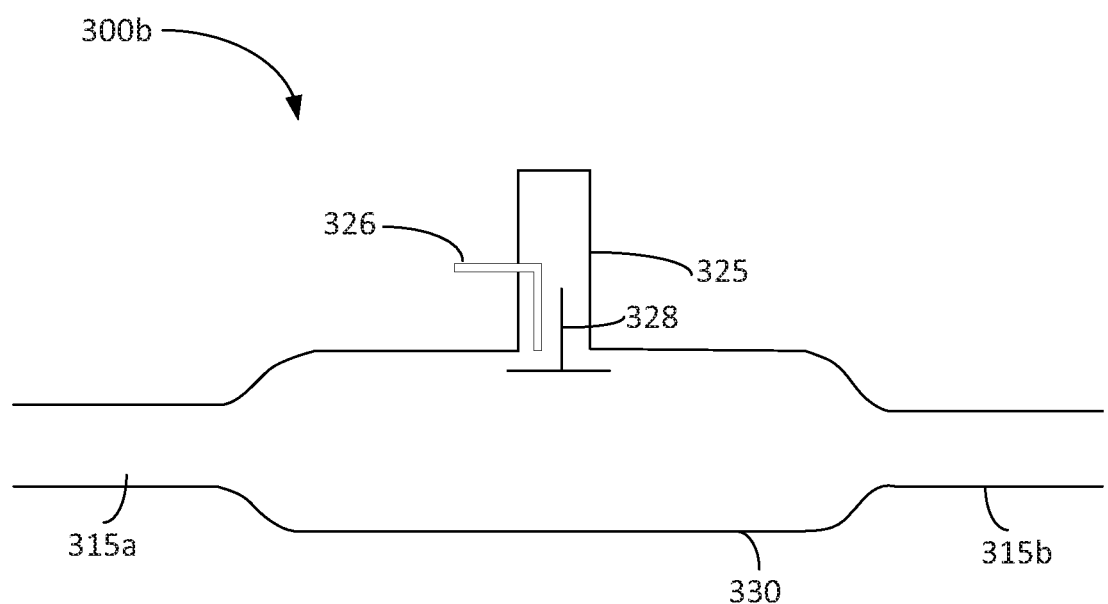

FIG. 3B shows yet another exemplary rotating pulse detonation engine 300 showing a one-way valve according to one or more embodiments of the present invention. The engine 300 has the air and fuel inlets 325, 326 with a check valve 328 (e.g., a spring-loaded disk on a spindle), which restricts the flow of fluids to a single direction by opening and closing under changes of relative pressure on each side of the valve 328. For example, when the pressure in the chamber 330 is about the same as or higher than the pressure in the air inlet 325, the pressure in the chamber 330 (and/or the spring in the check valve 328) pushes the valve 328 up, closing the chamber 330. After the shock wave leaves the chamber 330, the chamber pressure is lower than the pressure in the air inlet 325, and thus the valve 328 opens, allowing air and fuel to come in to the chamber 330. As a result, when the chamber pressure is high (e.g., during detonation), fuel and air flow into the chamber 330 stops, and when the chamber pressure is low, fuel and air are injected into the chamber 330. The one-way valve 328 may comprise a Reed valve, and may be made of stainless steel. Alternatively, a rotor/stator valve design may be used to control the air and fuel flow into the chamber 330 (see, e.g., U.S. Pat. No. 9,188,002 issued on Nov. 17, 2005, the relevant portions of which are incorporated herein by reference).

Figure 3C:
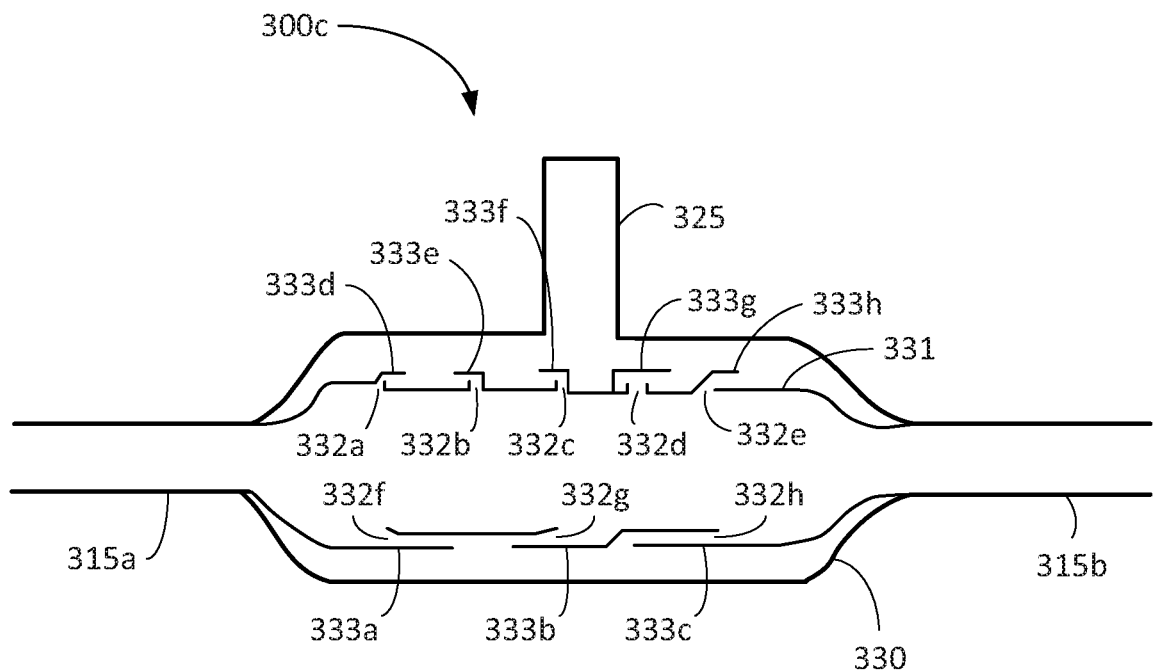

FIG. 3C shows a further exemplary rotating pulse detonation engine 300c having a double-walled chamber 330 according to one or more embodiments of the present invention. Optionally, the double-walled chamber 330 includes an inner wall 331 having a plurality of small openings 332a-332h therein. A metal cover 333a-h may be welded on top of or over the openings, leaving a gap in between. Thus, in some embodiments, the inner wall and cover may form a baffle. Fluid can flow from the space in between the inner wall 331 and outer wall 330 to the inner chamber of the combustion chamber 330 and vice versa. However, the shock/detonation waves do not "see" the opening instantly because of the indirect channel path formed by the cover 333a-h, allowing for easier detonation. Furthermore, the more curved or smooth the openings 332a-h and/or arms 315a-b are, the more indirect the path of the detonation or shock waves becomes, increasing detonation efficiency and effectiveness. The small openings 332a-h may point in various directions, creating a turbulent flow of the air and fuel for complete burning.

Additionally, a cooling conduit (not shown) comprising thermally conductive tubing winding around the detonation and/or combustion chamber 330 (e.g., in a coil or serpentine pattern). In one example, water may be passed through the cooling conduit to act as a coolant. The tubing may have one or more holes or openings therein (e.g., to release steam into the housing), and high-temperature steam in the housing (e.g., housing 210, which can be similar to a drum casing) can react chemically with the exhaust gases to form acids, such as nitric acid ($HNO_3$) and carbonic acid ($H_2CO_3$). After cooling the acid(s) to a liquid phase (e.g., using a condenser in the exhaust duct), the acid(s) can be collected for recycling. Zero emissions can be achieved for the present RPDE, which is a significant advantage for this type of engine.

In some embodiments of the present invention, the engine 300 may include an ignition device 335 (e.g., a spark plug) that ignites or detonates the fuel in the detonation and/or combustion chamber 330. The ignition device 335 may include an electrical igniter (e.g., a spark generator or spark plug) or other form of ignition device known in the art, as discussed herein. Deflagration is initiated by the ignition device 335, and the exhaust rushes down the arms 315a-b and out of the nozzles 341a-b as thrust, providing rotational movement of the chamber 330, arms 315a-b and shaft 327. The centrifugal force from the rotational movement accelerates the exhaust down the arms 315a-b to the point where ignition of the fuel in the combustion chamber 330 becomes fast enough to become a detonation.

During operation of the rotating pulse detonation engine, the exhaust or hot gas from combustion chamber rushing out the nozzles act as a propellant for the rotating arms. Adjusting the direction of the nozzle to appendicular to the rotating arm (e.g., an angle of 60-120°, and in one example, about 90°), increases the force acting on the rotating arm and the rotation speed according to Newtonian mechanics. The centrifugal force on the exhaust/propellant increases as the rotation speed, increasing the rotational force/thrust and decreasing the period of the detonation/pulse cycles. When the rotational thrust and/or force increases, so does the rotation speed. This is a controllable chain reaction that enables the thrust to reach supersonic speeds and many times beyond, without the burden of excess fuel consumption. Therefore, the RPDE chain reaction provides smart solutions to Super Sonic Transport (SST) and Vertical Take Off and Landing (VTOL) vehicles.

Table 1 below shows a comparison chart of the present rotating pulse detonating engine (RPDE) and conventional gas turbine technology.

TABLE 1

| RPDE | Gas Turbine Engine |
| --- | --- |
| Detonation cycles produce high pressure shock wave in a constant volume reaction process | Brayton thermodynamic cycle |
| Compressor is not required | Multistage compressors required to increase the pressure |
| Basic design recently established | Technology mature, highly optimized |
| Improves specific fuel consumption | |
| Low manufacturing cost | Precision parts are critical |
| Light weight | |

The present RPDE deploys multiple power outlets and multiple power outputs, having advantages over conventional engines with a single power outlet/output, as shown in Table 2 below.

TABLE 2

| RPDE | Single Outlet PDE Engines |
| --- | --- |
| Balanced | Unbalanced |
| Multiple power outputs | Single (pair) output |
| Complete burning/combustion of fuel | Incomplete burning/combustion of fuel |

From a microscopic point of view, about half of the particles resulting from detonation in a single outlet engine must change their direction of travel to exit through the single outlet. Collisions among those particles and the chamber wall result in a substantial loss in their kinetic energy. However, the present multi-outlet engine significantly reduces or substantially eliminates such kinetic energy loss in the detonation or exhaust gases, increasing the efficiency of the present engine.

Figure 4:
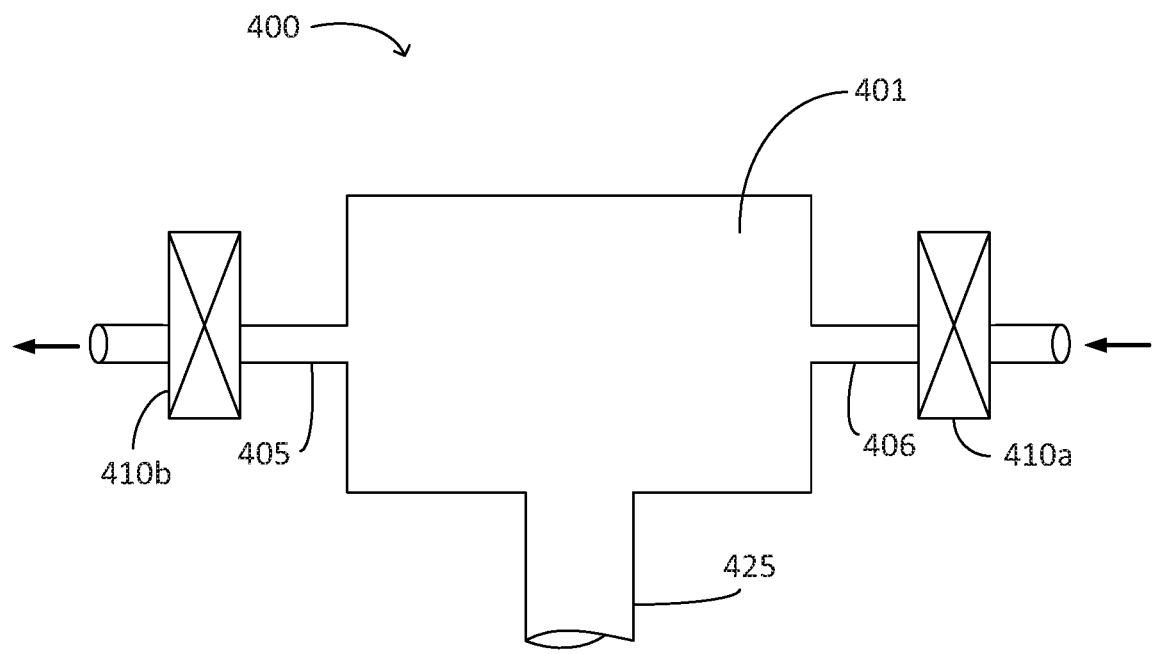
FIG. 4 is a diagram showing an exemplary reservoir according to one or more embodiments of the present invention.

FIG. 4 is a diagram showing an exemplary air supply reservoir 400 according to embodiments of the present invention. In various embodiments, the engine (e.g., engine 200 of FIGS. 2A-B and engine 300 of FIG. 3) includes at least one reservoir 400 between the compressor (e.g., compressor 264 in FIG. 2B) and the detonation and/or combustion chamber (e.g., chamber 230 of FIGS. 2A-B and 330 of FIG. 3). As shown in FIG. 4, a first regulator 410a introduces compressed air into the reservoir tank 401 from the compressor. The reservoir 400 further includes a conduit or outlet 425 that transports or carries air from the reservoir tank 401 to the detonation and/or combustion chamber (e.g., through the air supply inlet thereof). In various embodiments, the reservoir 400 may include a second regulator to allow compressed air to escape from the reservoir tank 401 if the pressure in the reservoir tank 401 becomes too high (e.g., exceeds a predetermined threshold). Furthermore, the reservoir 400 may include a pressure sensor or gauge to measure the pressure in the reservoir tank 401.

In some embodiments, one or more valves (not shown) may be between (i) the detonation and/or combustion chamber (e.g., chamber 230 of FIG. 2A) and (ii) at least one of the air supply channel and the fuel supply inlet (e.g., fuel inlet 227 of FIG. 2A) to regulate inflow of air and/or fuel to the detonation and/or fuel to the detonation and/or combustion chamber and control a pulse frequency for detonation of the fuel in the detonation and/or combustion chamber. The valve may directly or indirectly receive at least some of the rotational thrust and/or force from the central rotating shaft (e.g., shaft 226 in FIG. 2A). Such valves are disclosed in U.S. Pat. No. 9,188,002, the relevant portions of which are incorporated herein by reference.

Figure 5A:
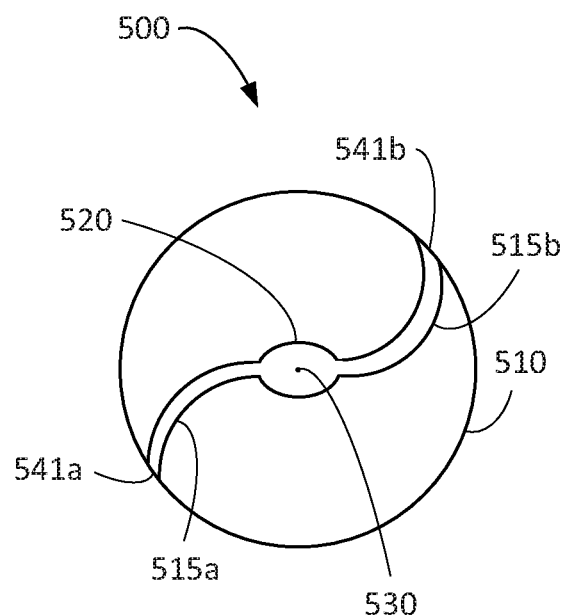
FIGS. 5A-B are diagrams showing exemplary alternative rotating pulse detonation engines according to embodiments of the present invention.
Figure 5B:
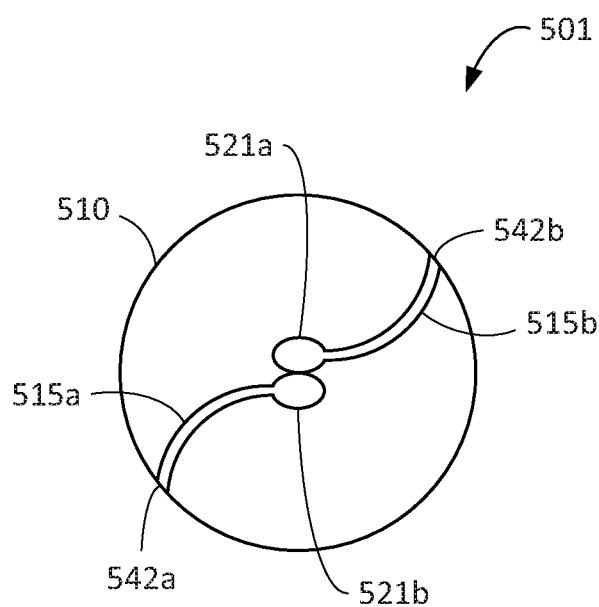

FIGS. 5A-B are diagrams showing exemplary engines 500 and 501 according to additional embodiments of the present invention. FIG. 5A is a diagram showing an exemplary engine 500 that includes a detonation and/or combustion chamber 520, at least two rotating arms 515a and 515b extending from opposing sides and/or ends of the detonation and/or combustion chamber 520, and a housing 510. The engine 500 has a central rotary shaft (not shown) along an axis 530 extending from the center of a surface of the detonation and/or combustion chamber 520. The rotating arms 515a and 515b may be curved or rounded. Such a configuration reduces back-pressure from the exhaust or detonation gases passing through the rotating arms (e.g., relative to rotating arms having a relatively sharp bend therein). In addition, each of the rotating arms 515a-b has a nozzle 541a or 541b, respectively, at a distal end thereof.

FIG. 5B is a diagram showing another exemplary engine 501 that includes at least two detonation and/or combustion chambers 521a and 521b within the housing 510. Each detonation and/or combustion chamber 521a, 521b has one rotating arm 515a, 515b respectively extending therefrom. In some embodiments, each detonation and/or combustion chamber 521a has a surface that is adjacent to or in contact with a surface of the closest detonation and/or combustion chamber 521b. The detonation and/or combustion chambers 521a and 521b may be welded together, connected by bolts, clamps and/or straps, and/or enclosed within a sub-housing (not shown). Such a sub-housing around the detonation and/or combustion chambers 521a and 521b may be cooled (e.g., by thermally conductive conduits that carry a cooling liquid/gas therein). Similar to the rotating arms of the engine of FIG. 5A, each of the rotating arms 515a-b of FIG. 5B may be curved or rounded. In addition, each of the rotating arms 515a-b has a nozzle 542a or 542b, respectively, at a distal end thereof.

FIGS. 6A-D are diagrams showing further exemplary engines 600-603 according to embodiments of the present invention. Engine 600 of FIG. 6A includes four rotating arms 615a, 615b, 615c, and 615d extending from a detonation and/or combustion chamber 620 within a housing 610. The engine 600 may include a central rotary shaft (not shown) extending from the center of a surface of the detonation and/or combustion chamber 620, along an axis 630. The four rotating arms 615a, 615b, 615c, and 615d may provide greater efficiency (e.g., in converting energy from the expanding detonation gases to mechanical energy) than an identical engine having only two rotating arms. The rotating arms 615a, 615b, 615c, and 615d of FIG. 6A may be curved or bent, although only linear portions thereof are shown. The rotating arms 615a, 615b, 615c, and 615d may have a first part or section in proximity to the detonation and/or combustion chamber 620 having a width greater than a second part or section of the rotating arms 615a, 615b, 615c, and 615d in proximity to the nozzle (not shown) or the housing 610. The rotating arms 615a, 615b, 615c and 615d are generally equally spaced apart around the detonation and/or combustion chamber 600. Arms 615a-d can also have tapered diameter or conical shape.

Figure 6A:
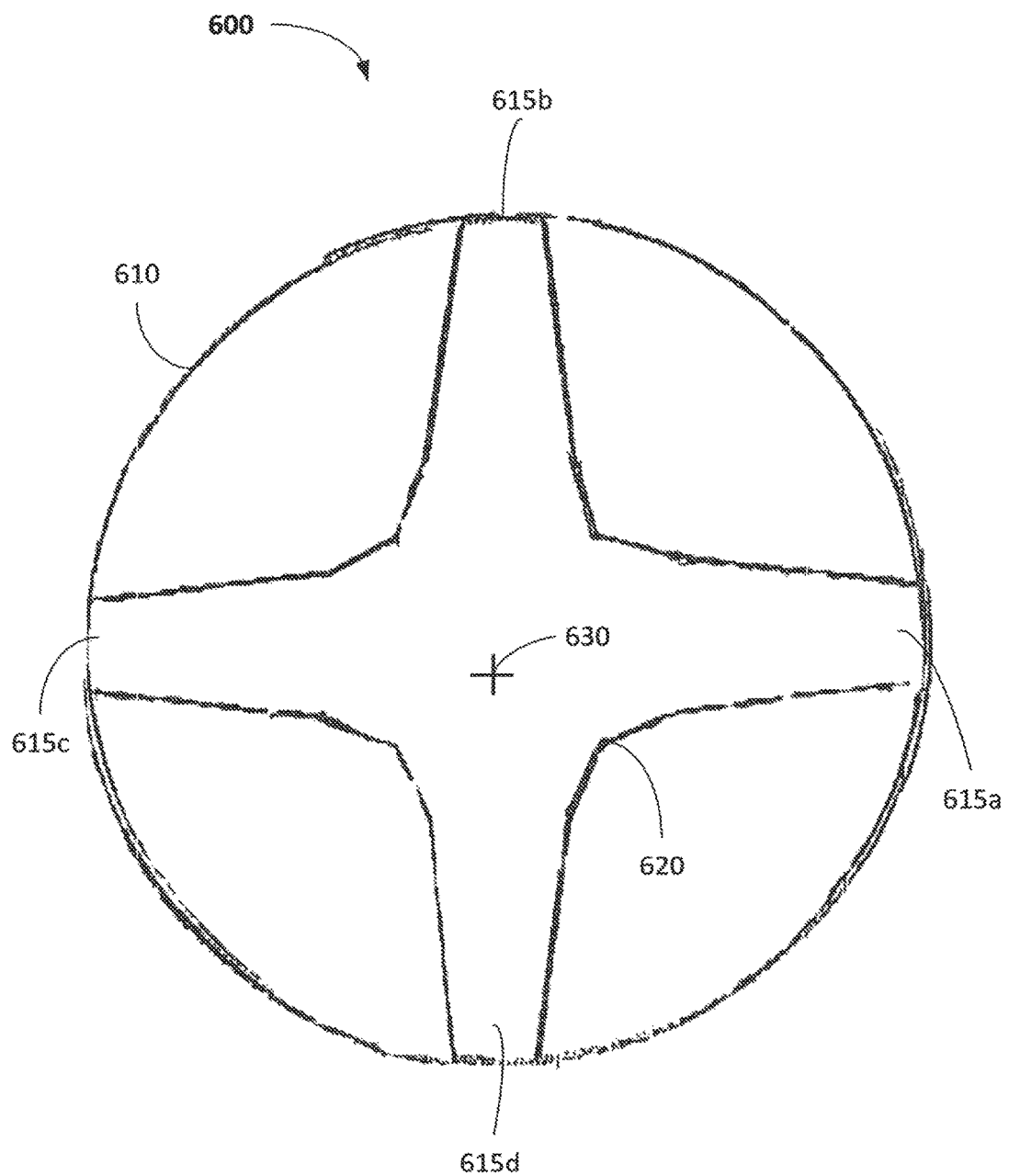
FIGS. 6A-D are diagrams showing various exemplary configurations for the rotating arms according to embodiments of the present invention.
Figure 6B:
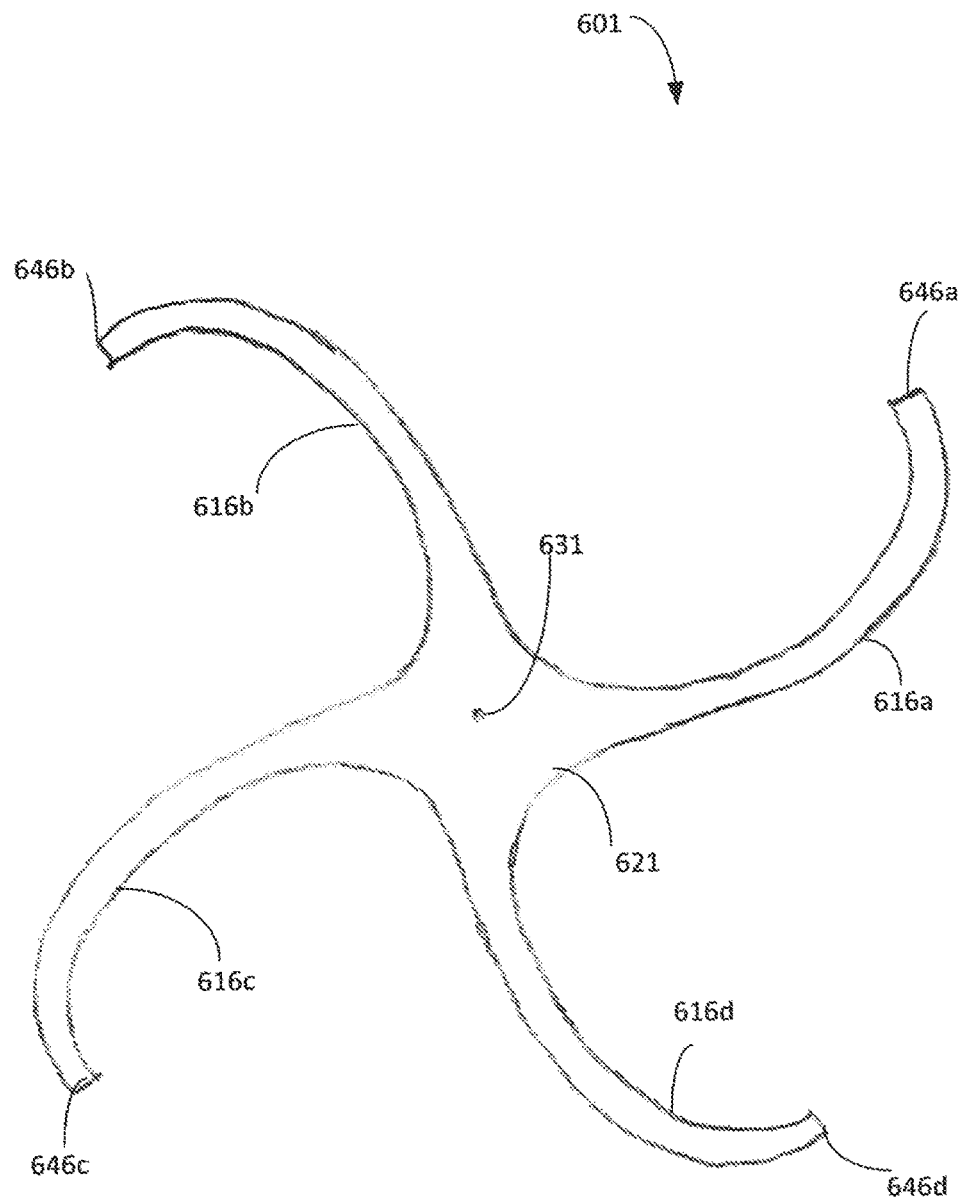

FIG. 6B shows another engine 601 having four rotating arms 616a, 616b, 616c, and 616d extending from a detonation and/or combustion chamber 621 that has a central rotary shaft (not shown) extending from a surface of the detonation and/or combustion chamber 621, along an axis 631. The rotating arms 616a, 616b, 616c, and 616d of FIG. 6B are curved or rounded. In addition, each of the rotating arms 616a-d has a nozzle 646a-d at a distal end thereof.

Figure 6C:
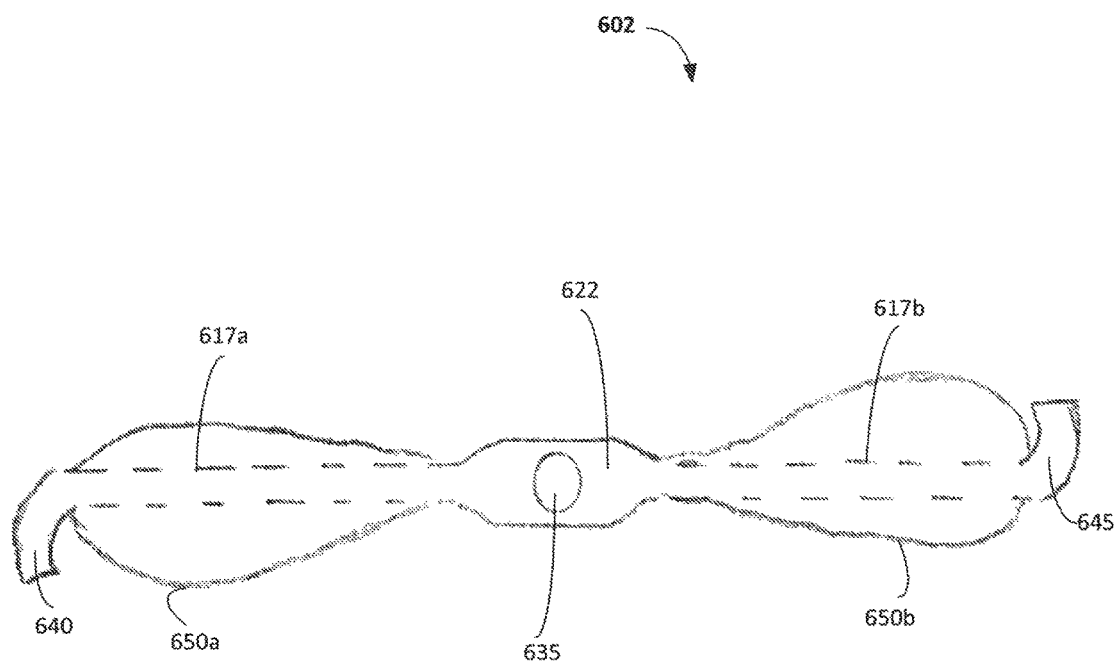

FIG. 6C shows an exemplary engine 602 in which each rotating arm 617a, 617b has a propeller blade 650a, 650b connected thereto or integral therewith. In some embodiments, the engine 602 may include a central rotary shaft 635 extending from a surface of the detonation and/or combustion chamber 622, that drives a motor or electricity generator (e.g., in the body of an airplane, drone, VTOL vehicle, or other flying object). The propeller blades 650a and 650b may increase the amount of thrust provided by rotation of the arms 617a-b. In some embodiments, each rotating arm 617a-b may be designed in the shape of the propeller blade 650a-b, with a cylindrical opening therein for the exhaust or detonation gases to pass through. In various embodiments, the propeller blades 650a and 650b may extend along the entire length of the rotating arms 617a-b, as shown in FIG. 6C. In some embodiments, the propeller blades 650a and 650b may extend less than the entire length of the rotating arms 617a-b. Each of the rotating arms 617a-b includes a nozzle 640 or 645 at a distal end thereof. The width of the propeller blades 650a and 650b may vary depending on the number of rotating arms and the amount of thrust desired and/or needed.

Figure 6D:
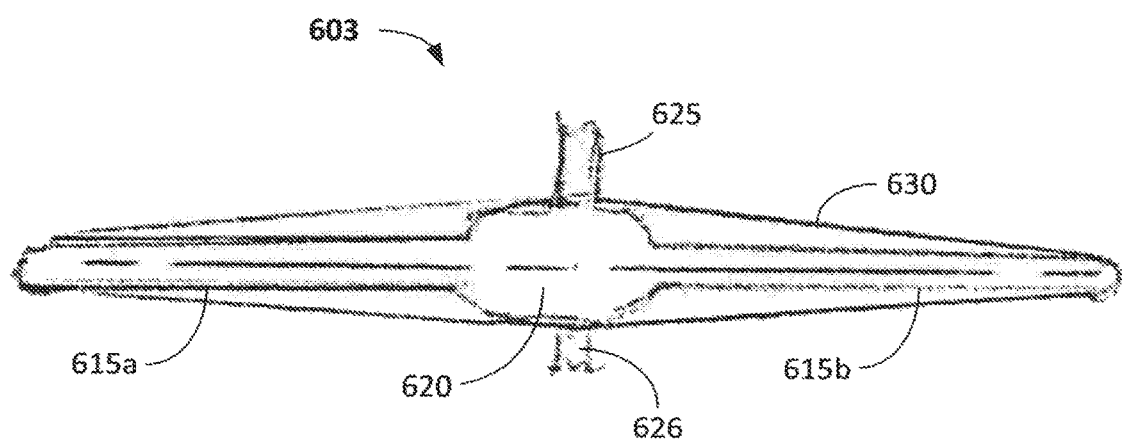

FIG. 6D shows an exemplary engine 603 in which each rotating arm 615a, 615b have metal sheets or foils 630 attached or connected thereto (e.g., wrapped around to form a disk) or integral therewith. The metal sheet 630 may be more aerodynamic than the rotating arms alone, thereby minimizing air resistance. In some embodiments, the rotating arms 615a-b may have a shape optimized for aerodynamic function(s). For example, the rotating arms 615a-b may have a relatively sleek or angled shape that reduces or minimize air resistance. In various embodiments, the metal sheet 630 may surround the detonation and/or combustion chamber 620 and the rotating arms 615a-b, as shown in FIG. 6D. In some embodiments, the metal sheet 630 may surround only the rotating arms 615a-b. The width of the metal sheet 630 may vary depending on the size of the housing and the necessity to minimize wind or air resistance. The engine 603 further includes an air supply and/or distribution channel 625 configured to supply air (and optionally a fuel) to the detonation and/or combustion chamber 620. The reduced air resistance may enable the engine 603 to provide more torque to the rotary force generated along or by the central shaft 626.

Figure 7:
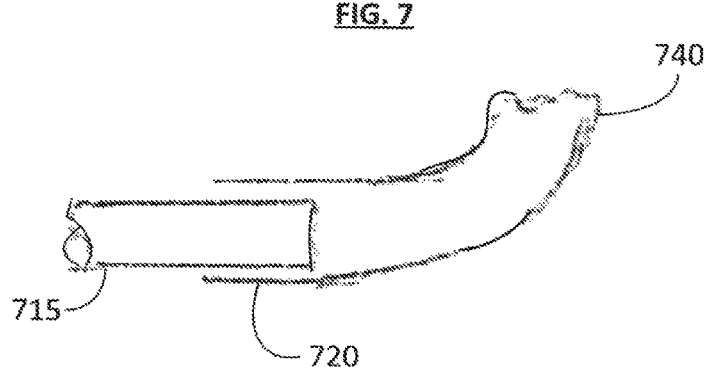
FIG. 7 is a diagram showing an exemplary nozzle on a rotating arm according to one or more embodiments of the present invention.

FIG. 7 is a diagram showing an exemplary nozzle 740 on a rotating arm 715 according to embodiments of the present invention. In some embodiments, the nozzle 740 may be attached to the corresponding rotating arm 715 using an adjustable connector 720, which can be a screw-on or threaded, glued, or shrink-fit connector. The adjustable connector 720 is on a distal end of the rotating arm 715, allowing adjustment of the position of the nozzle 740. For example, the angle of the rotating arm 715 relative to plane of rotation of the arm 715 can be adjusted. Also, the length of combined rotating arm 715 and nozzle 740 can be varied by adjusting the position of the connector 720.

FIGS. 8A-B are cross-sectional diagrams of exemplary nozzles 800a-b according to embodiments of the present invention. FIG. 8A shows an exemplary nozzle 800a having an outlet 850 through which the detonation or exhaust gases exit the nozzle 800a. The outlet 850 has a width or diameter 815 that may be the same as, substantially the same as, or similar to the width or diameter of the corresponding rotating arm or adjustable connector (not shown). The exemplary nozzle 800a of FIG. 8A has a constriction 810 that has a width or diameter that is substantially less than the width or diameter 815 of the outlet 850 or the connector 805. In addition, the nozzle 800a has a connector 805 having an opening 801 that connects to a rotating arm or adjustable connector (not shown). The opening 801 of the connector 805 has a width or diameter that is substantially the same as or slightly greater than the width or diameter of the outlet 850. In some embodiments, the connector 805 has a length that is at least half of the length of the nozzle 800a. The nozzle 800a advantageously minimizes air resistance and maximizes thrust (e.g., by increasing the velocity of the exhaust gases). However, the nozzle 800a may have less control over the direction of the flow of the exhaust gas relative to a completely cylindrical nozzle.

FIG. 8B shows an alternative nozzle 800b that is substantially the same as the nozzle 800a of FIG. 8A, but that further includes an exhaust section 820 having a length similar to or less than that of the connector 805. The nozzle 800b provides better control of the direction of the exhaust gas flow. However, the nozzle 800b may impart slightly greater resistance and slightly less velocity to the exhaust gases than the nozzle 800a of FIG. 8A.

FIG. 8C shows another exemplary nozzle (e.g., an augmenter) 800c according to an embodiment of the present invention. The nozzle 800c has an add-on thrust augmenter cone 805 on or attached to the nozzle connector region 802. The augmentor cone 805 draws more air into the nozzle and increases thrust. One end of the cone 805 may slide onto the nozzle connector 802 and/or slip into the nozzle opening.

The nozzle 800c of FIG. 8C has an outlet 850 through which the detonation or exhaust gases exit the nozzle. Initially, the air outside the outlet 850 creates a negative force on the detonation or exhaust gases, and when the air goes into the cone 805, the air creates a positive force on the detonation or exhaust gases, canceling out the negative force. As a result, the thrust going out of the cone 805 may be amplified. The outlet 850 has a width or diameter 830 that is greater than the width and/or diameter of the remaining portions of the nozzle 800c and the corresponding rotating arm and adjustable connector (not shown). The exemplary nozzle 800c and/or cone 805 of FIG. 8C may have an expander (not shown) that has a width that is less than the outlet 850, but greater than the connector 802. The expander can be tapered (linear), flared (curved), a combination thereof, etc. The cone 805 has an opening 801 that connects to the connector portion or end of the rotating arm. In some embodiments, the connector portion 802 is inserted about halfway into the length of the cone 805 (e.g., from about 10% to about 50% of the length of the cone 805).

Figure 8D:
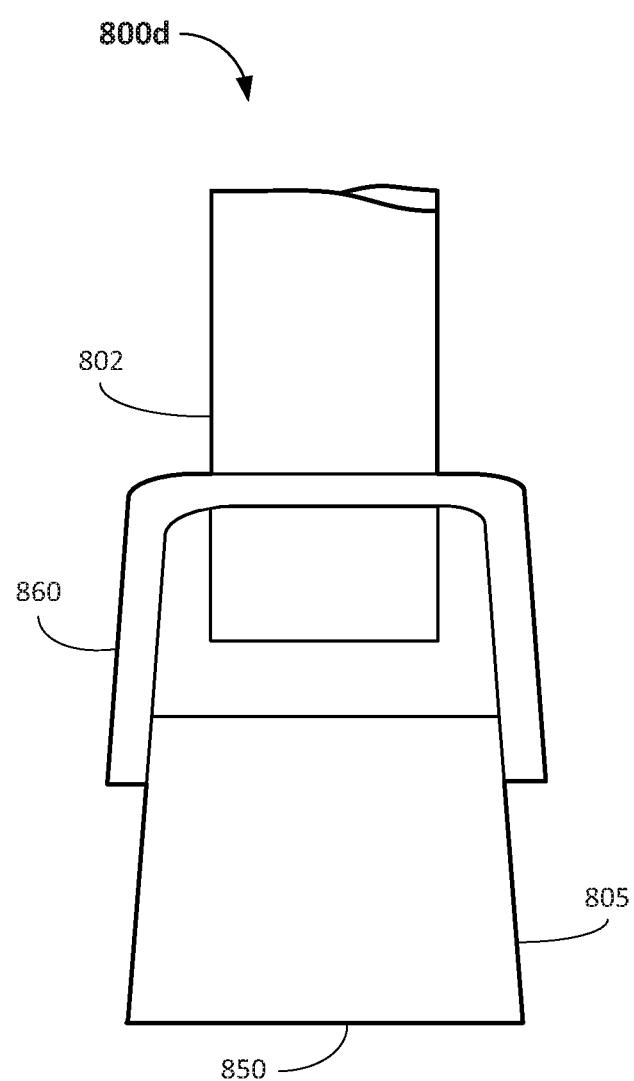

FIG. 8D shows another exemplary nozzle 800d having a support/connection device 860 that connects the cone 805 and nozzle connector portion or end 802. The device 860 and the cone 805 are separate structures. The support/connection device 860 may include a support ring or a ring-like structure that, at one end, fits around the nozzle connector 802, and at an opposite end, fits around the cone 805, providing a secure mechanical connection.

FIG. 8E shows an alternative nozzle 800e that is substantially the same as the nozzle 800c of FIG. 8C, but that includes an integral exhaust section 835 that has an annular or ring-like shape. The exhaust section 835 of the nozzle 800e has an outer wall 840 and a deflector 860 therein. The deflector 860 may be flared or linear (e.g., cone-shaped). The exhaust section 835 may increase the air resistance of the nozzle 800e slightly, and the deflector 860 may impart slightly greater back-pressure, but the deflector 860 may increase (or at least keep constant) the velocity of the exhaust gases, while at the same time distributing the flow of the exhaust gases (e.g., within a housing) to minimize turbulence.

The present combustion chamber advantageously achieves complete combustion and/or detonation of the fuel, and thus, maximum fuel efficiency and minimal generation and transportation of solid particles through the exhaust (e.g., to the turbine fan or external environment), thereby enabling a fan design that increases or maximizes use of thrust from the exhaust gases leaving the detonation and/or combustion chamber(s) and reducing pollutants introduced into the environment. Overall, the present invention is relatively simple and inexpensive to manufacture. In addition, high precision components may not be necessary when manufacturing the present invention. Furthermore, the present invention advantageously results in relatively high efficiency and/or improved engine performance. Alternative fuels (e.g., ammonium nitrate powder, ammonia gas, hydrazine, etc.) as well as carbon-based materials such as propane, methane, natural gas, gasoline, diesel or jet fuel, cellulose powder (wood powder or sawdust), etc., can be used in the present engine. It is well within the abilities of those skilled in the art to connect the fuel supply to the fuel inlet with a regulator in between. For fuels in liquid phase, a device such as a fuel injector will do the job. For fuel in powder form, powder storage in a tank requires a fluidized bed to loosen the powder, and the air supply carry the powder to the fuel inlet. For fuel in the gas phase, simply connect the fuel supply to the inlet with a regulator in between. Therefore, the present engine is environmentally friendly, and adaptable for use in the power generation industry, in vehicles, etc.

An Exemplary Method of Converting Fuel into Energy

FIG. 9 is a flow chart 900 showing steps of an exemplary method of converting fuel to energy according to one or more embodiments of the present invention. The exemplary method generally includes introducing air into a detonation and/or combustion chamber through an air supply channel, introducing a fuel into the detonation and/or combustion chamber through a fuel supply and/or inlet, detonating the fuel in the detonation and/or combustion chamber, exhausting detonation gas(es) through a plurality of rotating arms extending radially from the detonation and/or combustion chamber, and converting a rotational thrust and/or force therefrom into mechanical work or energy. Each rotating arm has an exhaust nozzle at a distal end thereof, as the detonation gases passing through the nozzles rotate the rotating arms, thereby generating the rotational thrust and/or force.

At step 910, the fuel and air are introduced into one or more detonation and/or combustion chambers through supply conduits, as described herein. In various embodiments of the method, the fuel is introduced into the detonation and/or combustion chamber through a fuel supply and/or inlet. The air (which may be compressed) is introduced into the detonation and/or combustion chamber through an air supply channel. When there is more than one combustion chamber, each combustion chamber may have its own fuel and air supply conduits. The air supply conduits may supply compressed air from a reservoir. A first regulator connected to the reservoir introduces compressed air into the reservoir tank, which directs the air to the detonation or combustion chamber through the air supply conduit. A second regulator connected to the reservoir may release excess air from or reduce the pressure in the reservoir tank. The air or fuel may be introduced into the detonation and/or combustion chamber through one or more valves between the fuel and/or air supply conduits and the detonation and/or combustion chamber. The fuel and air supply conduits may be along a central shaft extending along a central axis normal to an outer surface of the detonation and/or combustion chamber (i.e., the rotational axis of the rotating arms and detonation and/or combustion chamber).

At 920, the fuel is ignited or detonated in the detonation and/or combustion chamber. Preferably, an igniter (e.g., a spark plug) located in the detonation and/or combustion chamber ignites the fuel fed into the detonation and/or combustion chamber from the fuel supply conduit. In some embodiments, the fuel is ignited only during the initial detonation and/or combustion cycle(s) (e.g., the first 1-100 cycles). Thereafter, the fuel may auto-ignite (e.g., from residual heat in the detonation and/or combustion chamber), and the igniter can be turned off Ideally, a single ignition is sufficient, but in some embodiments, more than one ignition may be useful or necessary.

At 930, the exhaust detonation gases travel through rotating arms and a corresponding exhaust nozzle to rotate the arms extending from the detonation and/or combustion chamber, providing thrust from the engine. Consequently, the rotation of the arms causes a central rotary shaft to rotate or spin, thereby providing a rotational force for motive power or mechanical work. In addition, the angle of the nozzles relative to the plane of rotation of the rotating arms can provide a thrust or force for motive power (e.g., for use in VTOL vehicles).

At 940, in exemplary embodiments of the present method, the exhaust/detonation gases from the nozzles are directed through at least one exhaust duct to a mechanical work unit (e.g., a turbine unit) in communication with or adjacent to the exhaust duct (e.g., outside of a housing containing the detonation and/or combustion chamber and rotating arms). The exhaust duct may extend from an opening in the housing. The exhaust gases may be directed from the exhaust duct(s) to the turbine unit using a reflector. The turbine may include one or more turbine fans that may be attached or affixed to a rod or shaft that may drive a compressor. The compressor takes in air from outside the engine, and supplies compressed air to the detonation and/or combustion chamber through the air supply channel. Alternatively, the exhaust/detonation gases from the nozzles may provide a thrust or force for motive power.

At 950, rotational power or force may be transferred directly or indirectly from the rotating detonation and/or combustion chamber to another mechanical work unit, separate from that receiving the exhaust/detonation gases. For example, a generator, a pump, or a turbine may receive the rotational force from the central rotary shaft described herein, which may, for example, directly rotate or drive a wheel in the generator or pump, or directly drive a fan in the turbine. Alternatively, rotation from the central rotary shaft may drive a belt, piston, cam, or other rotary force-receiving mechanism in a motor, in the pump, or in another work-, power-, or electricity-generating device or apparatus.

CONCLUSION/SUMMARY

The present invention provides an engine that advantageously can be integrated into conventional electricity power generation systems without special design changes or excessive costs. Additionally, the present engine can be manufactured using materials and parts similar to those used in conventional engines, and thus the cost of manufacturing may be substantially the same as (or less than) that of conventional engines. Furthermore, the present engine may more efficient and have less wear-and-tear than conventional combustion engines.

In addition, the present engine is advantageously simpler and easier to manufacture and repair than conventional rocket engines, as the payload can be absent, the fuel and oxidizer tanks can be located outside of the same housing that includes the combustion chamber (which may also improve the safety of the present invention), and the efficiency can be greatly improved. For example, with less weight in the housing containing the combustion/detonation chamber, frictional forces can be reduced, and the atmosphere inside the engine can be made less dense, further reducing rotational resistance in the present engine. As a result, the present engine and method(s) can contribute a relatively high propulsion of the thrust towards rotational torque.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. An engine, comprising:
    a) a detonation and/or combustion chamber configured to detonate a fuel and rotate around a central rotary shaft extending from said detonation and/or combustion chamber, said detonation and/or combustion chamber comprising an inner wall and an outer wall, said inner wall comprising a plurality of covers having an air gas spaced from the inner wall forming a respective plurality of small indirect openings configured to generate cross flow, reverse flow and/or cyclone flow inside said detonation and/or combustion chamber from said detonation gases;
    b) a fuel supply inlet configured to provide said fuel to said detonation and/or combustion chamber;
    c) an air supply channel centrally located to said detonation and/or combustion chamber and configured to supply air to said detonation and/or combustion chamber;
    d) at least one pair of rotating arms extending radially from said detonation and/or combustion chamber and configured to exhaust detonation gases from detonating said fuel in said detonation and/or combustion chamber and provide a rotational thrust and/or force, each of said rotating arms having an exhaust nozzle at a distal end thereof, said exhaust nozzle being at or having an angle configured to provide said rotational thrust and/or force, wherein each said pair of rotating arms is at opposing ends of said detonation and/or combustion chamber;
    e) a housing having upper and lower surfaces, wherein said housing encloses said detonation and/or combustion chamber, said rotating arms and said exhaust nozzles, and said central rotary shaft extends from said upper and lower surfaces of said housing; and
    f) a mechanical work unit configured to receive at least part of said rotational thrust and/or force.

2. The engine of claim 1, wherein each of said rotating arms comprises a cylinder or a curved tubular arm.

3. The engine of claim 1, wherein each of said rotating arms further comprises one or more metal sheets, metal foils, or ceramic structures configured to optimize an aerodynamic function.

4. The engine of claim 1, wherein said rotating arms are equally spaced from each other by 360°/n, where n equals a number of said rotating arms.

5. The engine of claim 1, wherein said nozzle has an opening oriented about 90° relative to an angle of a corresponding one of said rotating arms from said detonation and/or combustion chamber or an imaginary straight line between the rotation axis to the nozzle opening.

6. The engine of claim 1, further comprising a valve between (a) at least one of said air supply and said fuel inlet and (b) said detonation and/or combustion chamber.

7. The engine of claim 1, further comprising an ignition device configured to ignite or detonate said fuel in said detonation and/or combustion chamber.

8. The engine of claim 1, wherein the mechanical work unit comprises a generator, a motor, a pump, or a turbine.

9. The engine of claim 1, wherein said housing comprises at least one exhaust duct extending therefrom.

10. The engine of claim 9, further comprising a turbine unit including one or more turbine blades rotated by said detonation gases.

11. The engine of claim 10, further comprising a compressor sharing said shaft with the turbine unit, configured to compress said air supplied by said air supply to the detonation and/or combustion chamber.

12. The engine of claim 1, wherein each of said rotational arms comprises thermal insulation.

13. The engine of claim 1, wherein each of said rotational arms comprises one or more fins thereon.

* * * * *